United States Patent
Shanmugam et al.

(10) Patent No.: US 10,825,104 B1
(45) Date of Patent: Nov. 3, 2020

(54) METHOD AND SYSTEM FOR INTEGRATING INVOICE RELATED FINANCIAL TRANSACTION DATA INTO A PERSONAL FINANCIAL MANAGEMENT AND BILL PAYMENT SYSTEM AND USING THE PAYMENT SOURCE TO MORE ACCURATELY IDENTIFY AND CATEGORIZE TAX RELATED FINANCIAL TRANSACTIONS USING THE PAYMENT METHOD

(71) Applicant: Intuit Inc., Mountain View, CA (US)

(72) Inventors: Elangovan Shanmugam, Cupertino, CA (US); Sean McCluskey, Redwood City, CA (US); Jesse Aaron Axelowitz, San Francisco, CA (US); Ashwin Singh Khurana, Fremont, CA (US); Michael J. Seilnacht, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 484 days.

(21) Appl. No.: 15/435,006

(22) Filed: Feb. 16, 2017

(51) Int. Cl.
*G06Q 40/00* (2012.01)
*G06Q 30/04* (2012.01)

(52) U.S. Cl.
CPC .............. *G06Q 40/10* (2013.01); *G06Q 30/04* (2013.01); *G06Q 40/12* (2013.12)

(58) Field of Classification Search
USPC .......................................................... 705/31
See application file for complete search history.

(56) References Cited

U.S. PATENT DOCUMENTS

| | | | |
|---|---|---|---|
| 5,724,584 A | 3/1998 | Peters et al. | |
| 5,893,902 A | 4/1999 | Transue et al. | |
| 6,856,974 B1 | 2/2005 | Ganesan et al. | |
| 6,993,502 B1* | 1/2006 | Gryglewicz | G06Q 20/207 705/19 |
| 7,225,197 B2 | 5/2007 | Lissar et al. | |
| 7,480,626 B1* | 1/2009 | Taricani, Jr. | G06Q 20/20 705/16 |
| 7,526,448 B2 | 4/2009 | Zielke et al. | |
| 8,112,355 B1 | 2/2012 | Lam et al. | |

(Continued)

FOREIGN PATENT DOCUMENTS

| | | |
|---|---|---|
| EP | 1043668 | 10/2000 |
| JP | 2004-259196 | 9/2004 |

(Continued)

OTHER PUBLICATIONS

Ravenscraft, "How I Used Mint Bills to Finally Simplify My Bill Payments," [online], Jul. 15, 2015. Retrieved from the internet <URL: https://lifehacker.com/how-i-used-mint-bills-to-finally-simplify-my-bill-payme-1717972364>.

(Continued)

*Primary Examiner* — William E Rankins
(74) *Attorney, Agent, or Firm* — Paradice and Li LLP

(57) ABSTRACT

Financial transaction data is obtained and integrated into a personal financial management and bill payment system. Payment method data associated with the financial transaction data is obtained from the personal financial management and bill payment system. The payment method data is then used to more accurately and automatically identify tax related financial transactions for processing as tax related financial transactions having tax ramifications.

8 Claims, 2 Drawing Sheets

(56) References Cited

U.S. PATENT DOCUMENTS

| | | |
|---|---|---|
| 8,346,568 B1 | 1/2013 | Del Favero et al. |
| 8,527,382 B2 | 9/2013 | McDonough et al. |
| 8,762,238 B2 | 6/2014 | Hahn-Carlson et al. |
| 8,798,354 B1 | 8/2014 | Bunzel et al. |
| 8,799,157 B1 | 8/2014 | Weisman et al. |
| 9,037,870 B1 | 5/2015 | Zheng et al. |
| 9,286,332 B1 | 3/2016 | Roumeliotis et al. |
| 9,397,983 B2 | 7/2016 | Moffat |
| 9,443,268 B1 | 9/2016 | Kapczynski et al. |
| 9,672,336 B1 | 6/2017 | Spence |
| 9,774,445 B1 | 9/2017 | Gandhasri |
| 9,934,494 B1 | 4/2018 | Nolte et al. |
| 10,192,206 B2 | 1/2019 | Shanmugam et al. |
| 2002/0010666 A1 | 1/2002 | Wright |
| 2002/0013850 A1 | 1/2002 | Mitchell et al. |
| 2003/0055754 A1* | 3/2003 | Sullivan ............... G06Q 30/02 705/31 |
| 2003/0101112 A1* | 5/2003 | Gallagher ............ G06Q 30/04 705/31 |
| 2003/0216990 A1 | 11/2003 | Star |
| 2004/0139011 A1 | 7/2004 | Kozee et al. |
| 2004/0172347 A1* | 9/2004 | Barthel ................ G06Q 10/10 705/31 |
| 2004/0193542 A1 | 9/2004 | Brown et al. |
| 2004/0210520 A1 | 10/2004 | Fitzgerald et al. |
| 2004/0215560 A1 | 10/2004 | Amalraj et al. |
| 2005/0177448 A1 | 8/2005 | Fu et al. |
| 2005/0209965 A1 | 9/2005 | Ganesan |
| 2005/0222952 A1 | 10/2005 | Garrett et al. |
| 2005/0234820 A1 | 10/2005 | MacKouse |
| 2005/0246234 A1 | 11/2005 | Munyon |
| 2006/0095372 A1 | 5/2006 | Venkatasubramanian et al. |
| 2007/0074047 A1 | 3/2007 | Metzger et al. |
| 2007/0100802 A1 | 5/2007 | Celik |
| 2008/0255971 A1 | 10/2008 | McKinnon et al. |
| 2008/0294555 A1* | 11/2008 | Bromma ............ G06Q 20/1085 705/43 |
| 2009/0006253 A1 | 1/2009 | Bresnan et al. |
| 2009/0089193 A1 | 4/2009 | Paintin |
| 2009/0089194 A1 | 4/2009 | Mathis et al. |
| 2009/0132414 A1 | 5/2009 | Philliou et al. |
| 2010/0100470 A1 | 4/2010 | Buchanan et al. |
| 2010/0146269 A1 | 6/2010 | Baskaran |
| 2011/0295731 A1 | 12/2011 | Waldron, III et al. |
| 2012/0036370 A1 | 2/2012 | Lim et al. |
| 2012/0140923 A1 | 6/2012 | Lee et al. |
| 2012/0150736 A1 | 6/2012 | Dickerson et al. |
| 2012/0221420 A1 | 8/2012 | Ross |
| 2012/0254000 A1 | 10/2012 | Ryzhikov et al. |
| 2012/0303522 A1 | 11/2012 | May et al. |
| 2013/0204756 A1 | 8/2013 | Orttung et al. |
| 2014/0012746 A1 | 1/2014 | Hanson et al. |
| 2014/0025564 A1 | 1/2014 | Evans |
| 2014/0129431 A1 | 5/2014 | Orttung et al. |
| 2014/0222669 A1 | 8/2014 | Novak et al. |
| 2014/0258104 A1 | 9/2014 | Harnisch |
| 2014/0279459 A1 | 9/2014 | Weiss et al. |
| 2014/0372169 A1 | 12/2014 | Kim et al. |
| 2015/0012489 A1 | 1/2015 | Ceribelli et al. |
| 2015/0220904 A1 | 8/2015 | Gibson et al. |
| 2015/0221051 A1 | 8/2015 | Settino |
| 2015/0310406 A1 | 10/2015 | Anderson et al. |
| 2016/0072824 A1 | 3/2016 | Johansson et al. |
| 2016/0232546 A1 | 8/2016 | Ranft et al. |
| 2017/0024743 A1 | 1/2017 | Fogel et al. |
| 2017/0039652 A1 | 2/2017 | Sandre et al. |
| 2017/0109831 A1 | 4/2017 | Arvapally et al. |
| 2017/0155628 A1 | 6/2017 | Rohloff et al. |
| 2017/0257214 A1 | 9/2017 | Stufflebeam |
| 2017/0316392 A1* | 11/2017 | Shanmugam ........ G06Q 20/102 |
| 2017/0316474 A1* | 11/2017 | Shanmugam ........ G06Q 20/209 |
| 2017/0316475 A1* | 11/2017 | Shanmugam ........ G06Q 20/102 |
| 2018/0032978 A1* | 2/2018 | Shanmugam ........ G06Q 20/102 |
| 2018/0032981 A1* | 2/2018 | Shanmugam ......... G06Q 20/29 |
| 2018/0033091 A1 | 2/2018 | Shanmugam et al. |

FOREIGN PATENT DOCUMENTS

| | | |
|---|---|---|
| WO | WO 03/096250 | 11/2003 |
| WO | WO 2015/012991 | 1/2015 |

OTHER PUBLICATIONS

"How Does Invoice Central Work?" [online]. Jan. 20, 2016, Retrieved from the internet <URL: www.invoicecentral.com/how-does-it-work/>.

"Screen Scraping," Techopedia.com, Dec. 23, 2014 [online]. Retrieved from: https://web.archive.org/web/20141223183223/https://www.techopedia.com/definition/16597/screen-scraping.

* cited by examiner

METHOD AND SYSTEM FOR INTEGRATING INVOICE RELATED FINANCIAL TRANSACTION DATA INTO A PERSONAL FINANCIAL MANAGEMENT AND BILL PAYMENT SYSTEM AND USING THE PAYMENT SOURCE TO MORE ACCURATELY IDENTIFY AND CATEGORIZE TAX RELATED FINANCIAL TRANSACTIONS USING THE PAYMENT METHOD

RELATED APPLICATIONS/INCORPORATION BY REFERENCE

This application is related to U.S. patent application Ser. No. 15/140,117, filed on behalf of the same Inventors of the present patent application, filed on Apr. 27, 2016, entitled "METHOD AND SYSTEM FOR PROVIDING INVOICES GENERATED THROUGH A BUSINESS INVOICING SYSTEM TO A CUSTOMER USER OF A PERSONAL FINANCIAL MANAGEMENT AND BILL PAYMENT SYSTEM," which is herein incorporated by reference in its entirety as if it were fully set forth herein.

This application is also related to U.S. patent application Ser. No. 15/140,131, filed on behalf of the same Inventors of the present patent application, filed on Apr. 27, 2016, entitled "METHOD AND SYSTEM FOR IDENTIFYING INVOICES THAT ARE PAID THROUGH A PERSONAL FINANCIAL MANAGEMENT AND BILL PAYMENT SYSTEM," which is herein incorporated by reference in its entirety as if it were fully set forth herein.

This application is also related to U.S. patent application Ser. No. 15/142,708, filed on behalf of the same Inventors of the present patent application, filed on Apr. 29, 2016, entitled "METHOD AND SYSTEM FOR INTEGRATING BUSINESS INVOICES INTO A PERSONAL FINANCIAL MANAGEMENT AND BILL PAYMENT SYSTEM," which is herein incorporated by reference in its entirety as if it were fully set forth herein.

BACKGROUND

Currently, several personal financial management and bill payment systems are available to help a personal financial management and bill payment system user, or any authorized party acting on behalf of a personal financial management and bill payment system user, obtain financial transaction data representing financial transactions conducted by the user, process/analyze the financial transaction data, display categorized financial transaction data, generate financial transaction reports, generate bills due and payments due reports, or make manual, semi-automated, or automatic bill payments through the personal financial management and bill payment system.

Some personal financial management and bill payment systems help users manage their finances or track their expenditures/financial transactions by providing a centralized interface with banks, credit card companies, and various other financial institutions, for electronically obtaining, identifying, or categorizing the user's financial transaction data.

Typically, personal financial management and bill payment systems obtain electronic financial transaction data, such as payee data, payment amount data, transaction date data, etc. via communication with banks, credit card providers, or other financial institutions using electronic data transfer systems, or various other systems for obtaining/transferring financial transaction data.

Once personal financial management and bill payment systems obtain financial transaction data, the financial transaction data is typically categorized into one of more financial transaction categories such as business expenses, home expenses, home repair expenses, automotive expenses, entertainment expenses, groceries, dining out, clothing, rent, mortgage, tax related/tax ramification related expenses, etc. This categorized financial transaction data is then processed to generate financial transaction reports, generate spending analysis reports, generate budget data or budget guideline reports, generate comparisons or peer based standing reports, identify and generate bills due and payments due reports, or make manual, semi-automated, or automatic bill payments through the personal financial management and bill payment system. Consequently, the ability to obtain and generate categorized financial transaction data is a central capability to virtually all personal financial management and bill payment systems and features.

In addition, it has been empirically shown that one of the most critical issues related to obtaining and keeping users of a personal financial management and bill payment system is minimizing the amount of data the user must manually enter into the personal financial management and bill payment system.

Therefore, two potentially conflicting pressures are faced by currently available personal financial management and bill payment system providers: the need for accurate and detailed financial transaction categorization data, which could logically be provided by user data entry, and the need to minimize required user interaction-particularly the need to minimize the amount of data the user must manually, or otherwise, provide.

To address this conflict, some personal financial management and bill payment systems implement automatic, or semi-automatic, financial transaction categorization features whereby the financial transaction data, such as payee data, payment amount data, transaction date data, etc. is processed and analyzed in an effort to automatically determine a financial category to be assigned to the financial transaction associated with the financial transaction data.

One particularly important financial transaction categorization/classification is that indicating a status of tax related financial transaction.

Herein, the term "tax related financial transaction" includes any financial transaction requesting or resulting in a transfer or re-categorization of funds that includes a transfer or re-categorization of funds that has potential tax ramifications to a user, i.e., has a potential for resulting in tax consequences for the user or for potentially causing a change in the user's tax liability. Examples of tax related financial transactions include, but are not limited to; bills or invoices for home repair or home improvement work; bills or invoices for child care; bills or invoices associated with charitable donations and projects; bills or invoices associated with healthcare; bills or invoices associated with business automobile travel; bills or invoices associated with business expenses; bills or invoices associated with business travel; bills or invoices associated with business related computing systems, office equipment, or office/business electronics; bills or invoices for professional services related to a business; or any other bills or invoices requesting or resulting in a transfer or re-categorization of funds that includes a transfer or re-categorization of funds that has potential tax ramifications to a user, i.e., has a potential for resulting in tax consequences for the user or potentially causing a change in the user's tax liability.

Clearly, the ability to identify as many tax related financial transactions as possible would be of significant benefit to users of both personal financial management and bill payment systems and tax preparation and filing systems. However, automatic, or semi-automatic, financial transaction categorization features, while helpful, are currently far from perfect mechanisms for identifying tax related financial transactions. This is true for several reasons.

First, the level of detail associated with much of the financial transaction data currently made available to personal financial management and bill payment systems is often inadequate for tax related financial transaction identification purposes. Currently, the only financial transaction data associated with a given financial transaction typically obtained/provided is financial transaction date data, financial transaction amount data, and, hopefully, financial transaction payee data. However, this level of financial transaction detail often provides very little information of value when it comes to determining a tax related status for a given financial transaction.

As a specific illustrative example, financial transaction data indicating a payment of $200.00 made to a department store, such as Walmart™, on a given date reveals almost no usable tax related financial transaction identification guidance. The transaction could represent a purchase of tires (an automotive financial category expense which could also be a tax related financial transaction); office supplies (a business financial category expense and a potential tax related financial transaction); groceries (a food/groceries financial category expense, typically not a potential tax related financial transaction); an appliance (a home financial category expense which could also be a tax related financial transaction); house paint (a home improvement financial category expense, typically not a potential tax related financial transaction); or any other type of purchase, or any combination of non-potential tax related financial transaction and potential tax related financial transaction related purchases. Consequently, in this illustrative example, without further data input from the user, typically manually entered, the $200.00 transaction can't be accurately categorized or processed as either a non-potential tax related financial transaction or a potential tax related financial transaction.

As seen above, the lack of detail in the financial transaction data associated with many financial transactions can not only result in an inability to identify potential tax related financial transactions, but it can also result in erroneous categorization of financial transactions as potential tax related financial transactions or non-potential tax related financial transactions. This is particularly problematic because correcting erroneous categorization of financial transactions as potential tax related financial transactions or non-potential tax related financial transactions often requires more processing, and even more user input, than simply obtaining the data from the user in the first place.

In addition, in order to obtain the most benefit from a personal financial management and bill payment system, receive the most accurate and useful reports, and most accurately automatically determine categorization of future financial transactions as potential tax related financial transactions as possible, it is critical that as much financial transaction data, including all payment due and payment made related financial transaction data, bill payment related financial transaction data, and invoice related financial transaction data associated with the user of the personal financial management and bill payment system be obtained by, or provided to, the personal financial management and bill payment system. This is because the accuracy of the automatic categorization of both current and future financial transactions as potential tax related financial transactions, or non-potential tax related financial transactions, increases when more financial transaction data is processed. Indeed, most reports generated by the personal financial management and bill payment system for the user are only accurate, or useful, if the vast majority, if not all, the financial transactions associated with the user are identified and processed.

Despite this fact, businesses are currently typically unable to access personal financial management and bill payment systems used by their customers and provide bills or invoices to their customers through the personal financial management and bill payment systems used by their customers. In addition, currently available personal financial management and bill payment systems do not provide a mechanism for automatically obtaining, identifying, or distinguishing, invoices, invoice related financial transaction data, or invoice payments from bill payment data and then properly processing and integrating identified invoice related financial transaction data into the personal financial management and bill payment system.

As used herein, the term "bill" includes, but is not limited to, an account statement or other potentially recurring cost and financial transaction. Currently, bill payments due are represented in personal financial management and bill payment system payment due data. Examples of bills include, but are not limited to: rent payments, utility payments, credit card payments, mortgage payments, vehicle loan payments, etc. Bills are typically associated with larger, well known, or nationally or regionally known, payee businesses. Herein the term "bill related financial transaction data" includes data representing all, or part of, a "bill."

In contrast to the term "bill," herein the term "invoice" includes, but is not limited to, documents/data associated with a specific product or service provided by a business and for which full payment is typically requested via a discrete invoice statement. A given discrete invoice is therefore typically a non-recurring expense or is associated with specific products or services rendered, even though multiple, and even recurring identical, invoices can be generated by the same payee business for the same payor customer if multiple products or services, or the same products or services, are provided. Invoices are typically associated with smaller, regional or local, payee businesses than those associated with bills. Herein the term "invoice related financial transaction data" includes data representing all, or part of, an "invoice."

Herein the term "financial transaction data" includes data representing all, or part of, a "bill" or "invoice." In addition, as used herein, the term "financial transaction data" can include data associated with any financial transaction conducted by, or on behalf of, a user of a personal financial management and bill payment system. Consequently, as used herein, the term "financial transaction data" includes, but is not limited to: bill related financial transaction data; invoice related financial transaction data; and any other personal financial management and bill payment system payment data representing payment due items to be paid through the personal financial management and bill payment system.

Herein the terms "payment," or "payment due," or "payment due items" are used interchangeably and include any payment owed, or made, by a first party, i.e., payor party, to a second party, i.e., a payee party. Consequently, as used herein, the terms "payment" or "payment due" can include both "bills" and "invoices."

Herein, the term "tax related financial transaction" includes any financial transaction, i.e., requesting or resulting in, a transfer or re-categorization of funds, that includes a transfer or re-categorization of funds that has potential tax ramifications to a user, i.e., has a potential for resulting in tax consequences for the user or potentially causing a change in the user's tax liability. Examples of tax related financial transactions include, but are not limited to; bills or invoices for home repair or home improvement work; bills or invoices for child care; bills or invoices associated with charitable donations and projects; bills or invoices associated with healthcare; bills or invoices associated with business automobile travel; bills or invoices associated with business expenses; bills or invoices associated with business travel; bills or invoices associated with business related computing systems, office equipment, or office/business electronics; bills or invoices for professional services related to a business; bills or invoices for office supplies; or any other bills or invoices requesting or resulting in, a transfer or re-categorization of funds, that includes a transfer or re-categorization of funds that has potential tax ramifications to a user, i.e., has a potential for resulting in tax consequences for the user or potentially causing a change in the user's tax liability.

Given that, as noted above, it is critical to maximize the amount of financial transaction data associated with the user of the personal financial management and bill payment system obtained by, or provided to, the personal financial management and bill payment system as possible, the inability of currently available personal financial management and bill payment systems to provide a mechanism for automatically obtaining, identifying, or distinguishing, invoices, invoice related financial transaction data, or invoice payments from bill payment data and then properly processing and integrating identified invoice related financial transaction data into the personal financial management and bill payment system is clearly a long standing technical problem in the financial management arts.

Furthermore, there is also a long standing technical problem in the financial management system, payment processing, and billing and invoicing arts in that financial management and bill payment systems are unable to identify financial transactions having potential tax ramifications to a user.

Consequently, there is a long standing technical need in the tax preparation, payment processing, invoice processing, and financial management arts for a technical solution for automatically integrating financial transaction data into a personal financial management and bill payment system, or obtaining, identifying, or distinguishing, financial transaction data, processing the integrated financial transaction data, and then accurately and automatically identifying tax related financial transactions for processing as tax related financial transactions having tax ramifications.

SUMMARY

In accordance with one embodiment, financial transaction data is obtained and integrated into a personal financial management and bill payment system. In one embodiment, the financial transaction data includes invoice related financial transaction data. In one embodiment, the financial transaction data includes bill related financial transaction data. In one embodiment, the financial transaction data includes invoice related financial transaction data and bill related financial transaction data.

In one embodiment, the integrated financial transaction data is then analyzed to identify and extract payment method data. In one embodiment, the payment method data includes data representing a method by which a payor user of the personal financial management and bill payment system pays one or more discrete bills or invoices associated with the financial transaction data.

In one embodiment, the payment method data is compared to known tax related payment methods data. In one embodiment, the known tax related payment methods data represents one or more historical payment methods identified as associated with historical tax related financial transactions.

If the payment method data matches the known tax related payment methods data, the financial transaction data associated with the payment method data is identified as tax related financial transaction data, the tax related financial transaction data representing one or more tax related financial transactions having tax ramifications.

The Inventors developed the embodiments described herein because they recognized that many users have one or more financial accounts dedicated to certain types of purchases having tax ramifications. For example, in one embodiment, a user has a first credit card that is historically only used to make purchases associated with a business. In one embodiment, the user has a second credit card that is historically only used to make payments associated with child care. Both business and child care expenses are potentially tax deductible and therefore have tax ramifications. Using the disclosed embodiments, financial transactions associated with the first credit card are identified as tax related financial transactions for processing as tax related financial transactions having tax ramifications, in one embodiment. In one embodiment, financial transactions associated with the second credit card are identified as tax related financial transactions for processing as tax related financial transactions having tax ramifications.

Consequently, using the disclosed embodiments, payment method data is leveraged to identify tax related financial transactions for processing as tax related financial transactions having tax ramifications.

Therefore, disclosed herein is a technical solution to the long standing technical need in the financial management and user experience arts for automatically integrating financial transaction data into a personal financial management and bill payment system, or obtaining, identifying, or distinguishing, financial transaction data, including invoice related financial transaction data; processing the integrated financial transaction data to extract payment method data, then using the payment method data to more accurately and automatically identify tax related financial transactions for processing as tax related financial transactions having tax ramifications.

In accordance with one embodiment of a method and system for integrating financial transaction data into a personal financial management and bill payment system to more accurately identify and categorize tax related financial transactions using payment method, access to financial transaction data generated by the one or more payee businesses is obtained.

In one embodiment, the financial transaction data represents one or more discrete bills or invoices submitted by one or more payee businesses requesting payment by one or more payor users of the personal financial management and bill payment system.

In one embodiment, the financial transaction data includes payee business identity data associated with each discrete bill or invoice represented in the financial transaction data. In one embodiment, the payee business identity data represents the identity of the payee business associated with each discrete bill and invoice represented in the financial transaction data.

In one embodiment, the financial transaction data includes payor user identity data associated with each discrete bill and invoice represented in the financial transaction data. In one embodiment, the payor user identity data represents the identity of the payor user associated with each discrete bill and invoice represented in the financial transaction data.

In one embodiment, the financial transaction data includes amount data associated with each discrete bill and invoice represented in the financial transaction data. In one embodiment, the amount data represents the payment amount associated with each discrete bill and invoice represented in the financial transaction data.

In one embodiment, the financial transaction data includes additional financial transaction data, such as, but not limited to, Level-3 financial transaction data. In one embodiment, the additional financial transaction data is associated with at least one discrete bill or invoice represented in the financial transaction data and provides additional transaction details, or information, associated with the at least one discrete bill and invoice represented in the financial transaction data.

In accordance with one embodiment, the financial transaction data is integrated into personal financial management and bill payment system payment due data associated with a personal financial management and bill payment system. In one embodiment, the personal financial management and bill payment system payment due data represents one or more payments due associated with one or more users of the personal financial management and bill payment system as payment due items to be paid through the personal financial management and bill payment system.

In one embodiment, the personal financial management and bill payment system payment due data includes payment method data. In one embodiment, payment method data includes data representing a method by which one or more users of the personal financial management and bill payment system pay one or more discrete bills or invoices. In one embodiment, payment method data includes data representing one or more accounts from which the one or more users of the personal financial management and bill payment system pay one or more discrete bills or invoices. In one embodiment, payment method data represents one or more financial accounts. In one embodiment, a financial account may include, but is not limited to, a credit account; a checking account; a line of credit; a stored value account; a debit account; a charge account; an ATM account; a stored-value account; a fleet account; a gift account; and a cash account.

In accordance with one embodiment, access to the personal financial management and bill payment system and the personal financial management and bill payment system payment due data, including the integrated financial transaction data, and the payment method data is obtained.

In accordance with one embodiment, the personal financial management and bill payment system and the personal financial management and bill payment system payment due data, including the integrated financial transaction data, and the payment method data is analyzed to identify a first discrete bill or invoice represented in the financial transaction data that includes payment method data associated with the first discrete bill or invoice represented in the financial transaction data.

In accordance with one embodiment, the additional first financial transaction data, including the payment method data, is identified, extracted, and analyzed to determine if the first discrete bill or invoice represented in the financial transaction data is a tax related bill or invoice having potential tax ramifications.

In one embodiment, the payment method data is compared to known tax related payment methods data. In one embodiment, the known tax related payment methods data represents one or more historical payment methods identified as associated with historical tax related financial transactions. In one embodiment, payment method data is compared to the known tax related payment methods data to identify payment method data associated with financial transaction data representing one or more financial transactions having potential tax ramifications.

In one embodiment, the known tax related payment methods data obtained from one or more users of the personal financial management and bill payment system. In one embodiment, the known tax related payment methods data is generated by obtaining access to historical financial transaction data. In one embodiment, the historical financial transaction data represents one or more historical financial transactions conducted by one or more users of the personal financial management and bill payment system. In one embodiment, historical tax related financial transaction data associated with the historical financial transaction data is identified. In one embodiment, the identified historical tax related financial transaction data associated with the historical financial transaction data is analyzed to identify historical payment method data associated with the identified historical tax related financial transaction data. In one embodiment, the identified historical payment method data is transformed into known tax related payment methods data.

In accordance with one embodiment, once the payment method data is compared to the known tax related payment methods data, a determination is made that the first discrete bill or invoice represented in the financial transaction data is a tax related bill or invoice having potential tax ramifications.

In accordance with one embodiment, once a determination is made that the first discrete bill or invoice represented in the financial transaction data is a tax related bill or invoice having potential tax ramifications, first bill or invoice status data associated with the first discrete bill or invoice represented in the financial transaction data is transformed into tax related status data.

In accordance with one embodiment, the portion of the financial transaction data representing the first discrete bill or invoice is then processed as tax related financial transaction data.

The disclosed embodiments provide an efficient, effective, and highly adaptable solution to the long standing technical need in the bill payment, bill and invoice processing, tax preparation and filing, and financial management arts for automatically integrating financial transaction data into a personal financial management and bill payment system, or obtaining, identifying, or distinguishing, financial transaction data, processing the integrated financial transaction data to extract payment method data, and then using the additional financial transaction data to more accurately and automatically identify tax related financial transactions for processing as tax related financial transactions having tax ramifications.

However, the disclosed method and system for integrating financial transaction data into a personal financial management and bill payment system to more accurately identify and categorize tax related financial transactions using payment method does not encompass, embody, or preclude other forms of innovation in the area of automated financial transaction bill payment, processing, and reporting, or tax preparation and filing. In addition, the disclosed method and system for integrating financial transaction data into a personal financial management and bill payment system to more accurately identify and categorize tax related financial transactions using payment method is not related to any fundamental economic practice, fundamental data processing practice, mental steps, or pen and paper based solution. In fact, the disclosed embodiments are directed to providing solutions to the relatively new problems associated with the automatic processing and display of electronic financial transaction data obtained from multiple sources, making electronic bill payments and determining tax liabilities, and the management and processing of large amounts of data, i.e., "big data." Consequently, the disclosed method and system for integrating financial transaction data into a personal financial management and bill payment system to more accurately identify and categorize tax related financial transactions using payment method is not directed to, does not encompass, and is not merely, an abstract idea or concept.

In addition, the disclosed method and system for integrating financial transaction data into a personal financial management and bill payment system to more accurately identify and categorize tax related financial transactions using payment method provides for significant improvements to the technical fields of electronic transaction data processing, tax return preparation, bill and invoice processing, financial transaction categorization, information dissemination, data processing, data management, data filtering and mining, automatic electronic bill payment, and user experience.

In addition, by allowing for the integration of financial transaction data into a personal financial management and bill payment system, the disclosed method and system for integrating financial transaction data into a personal financial management and bill payment system to more accurately identify and categorize tax related financial transactions using payment method helps users of the personal financial management and bill payment system identify and pay their bills, invoices, and taxes. This, in turn, helps avoid the reissuance and repeated transmission of payment and tax due reminders and for the entry, processing, and dissemination of redundant bill, invoice, and tax data; thereby eliminating unnecessary data analysis before resources are allocated to processing, or correcting, redundant data and the redundant data is further transmitted/distributed.

Furthermore, the disclosed method and system for integrating financial transaction data into a personal financial management and bill payment system to more accurately identify and categorize tax related financial transactions using payment method provides for the entry, processing, and dissemination of only relevant portions of tax related data; thereby eliminating unnecessary data analysis and correction before resources are allocated to processing, or correcting, faulty/irrelevant data, or the faulty/irrelevant data is further transmitted/distributed.

Consequently, using the disclosed method and system for integrating financial transaction data into a personal financial management and bill payment system to more accurately identify and categorize tax related financial transactions using payment method results in more efficient use of human and non-human resources, fewer processor cycles being utilized, reduced memory utilization, and less communications bandwidth being utilized to relay data to, and from, backend systems and client systems.

As a result, computing systems are transformed into faster, more efficient, and more effective computing systems by implementing the method and system for integrating financial transaction data into a personal financial management and bill payment system to more accurately identify and categorize tax related financial transactions using payment method.

Figure 1:
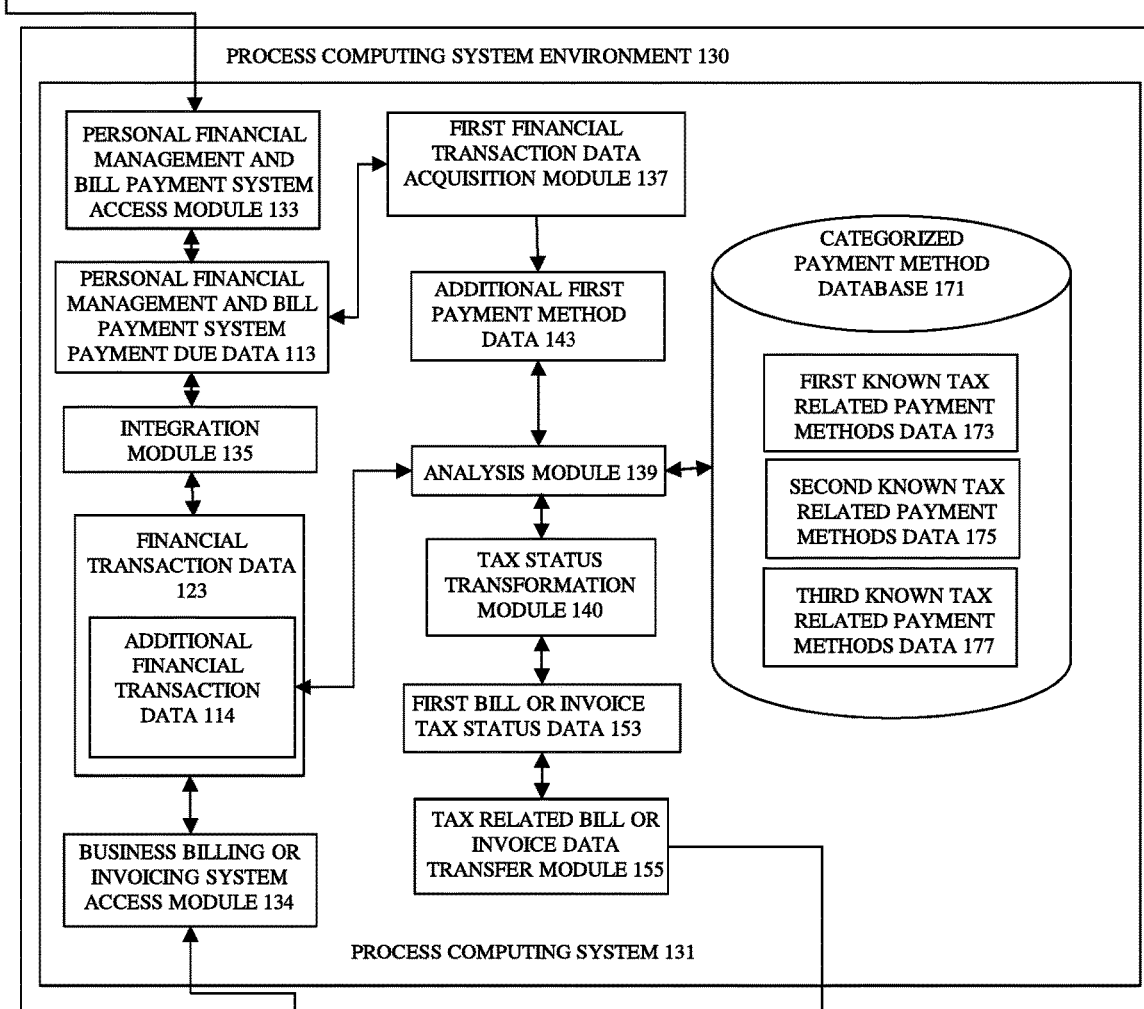
FIG. 1 is a high level functionality-based block diagram of a hardware and production environment for integrating financial transaction data into a personal financial management and bill payment system to more accurately identify and categorize tax related financial transactions using payment method, in accordance with one embodiment.
Figure 1:
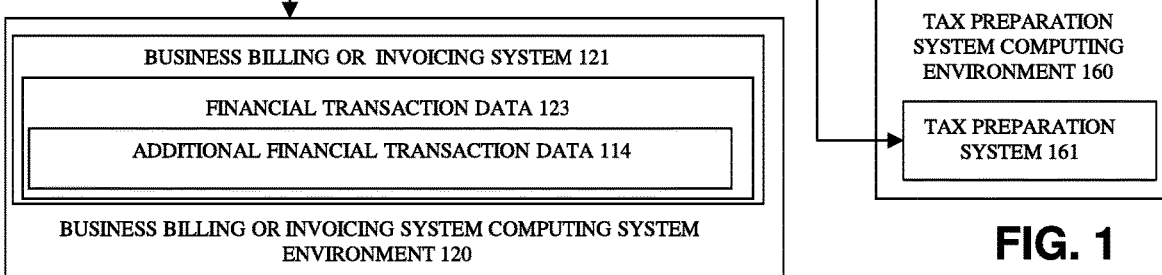

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

Term Definitions

Herein, the term "personal financial management and bill payment system" includes, but is not limited to, the following: computing system, desktop system, mobile system, or wearable device implemented, or online, or web-based, storage based, persistence based, personal financial transaction aggregation or processing systems, services, packages, programs, modules, or applications; computing system, desktop system, mobile system, or wearable device implemented, or online, or web-based, storage based, persistence based, personal financial management and budgeting systems, services, packages, programs, modules, or applications; computing system, desktop system, mobile system, or wearable device implemented, or online, or web-based, storage based, persistence based, personal data management systems, services, packages, programs, modules, or applications; computing system, desktop system, mobile system, or wearable device implemented, or online, or web-based, storage based, persistence based, personal accounting systems, services, packages, programs, modules, or applications; and various other personal electronic data management systems, services, packages, programs, modules, or applications, whether known at the time of filing, or as developed later.

Specific examples of personal financial management and bill payment systems include, but are not limited to the following: Mint™, available from Intuit, Inc. of Mountain View, Calif.; Mint Online™, available from Intuit, Inc. of Mountain View, Calif.; or various other software systems discussed herein, or known to those of skill in the art at the time of filing, or as developed after the time of filing.

Herein, the terms "business billing or invoicing system," "business billing system," and "business invoicing system" include, but are not limited to, any system through which a business can generate, or submit, or process bills or invoices requesting payment for products or services provided by the business to customers of the business. Therefore, the term "business billing or invoicing system" includes, but is not limited to, the following: computing system, desktop system, mobile system, or wearable device implemented, or online, or web-based, storage based, persistence based, business accounting or invoicing systems, services, packages, programs, modules, or applications; computing system, desktop system, mobile system, or wearable device implemented, or online, or web-based, storage based, persistence based, business financial transaction aggregation or processing systems, services, packages, programs, modules, or applications; computing system, desktop system, mobile system, or wearable device implemented, or online, or web-based, storage based, persistence based, business financial management and budgeting systems, services, packages, programs, modules, or applications; computing system, desktop system, mobile system, or wearable device implemented, or online, or web-based, storage based, persistence based, business management systems, services, packages, programs, modules, or applications; and various other business electronic data management systems, services, packages, programs, modules, or applications, whether known at the time of filling, or as developed later.

Specific examples of "business billing or invoicing systems" include, but are not limited to, the following: QuickBooks™, available from Intuit, Inc. of Mountain View, Calif.; QuickBooks Online™, available from Intuit, Inc. of Mountain View, Calif.; QuickBooks Self-Employed™, available from Intuit, Inc. of Mountain View, Calif.; or various other software systems discussed herein, or known to those of skill in the art at the time of filing, or as developed after the time of filing.

Herein, the terms "tax preparation system," "tax filing system," "tax return preparation and filing system," and "tax preparation and filing system," are used interchangeably and include, but are not limited to, the following: computing system, desktop system, mobile system, or wearable device implemented, or online, or web-based, storage based, persistence based, tax preparation and filing or processing systems, services, packages, programs, modules, or applications; and various other tax preparation and filing systems, services, packages, programs, modules, or applications, used to process or facilitate the filing of electronic tax or hardcopy tax return documents, whether known at the time of filling, or as developed later.

Specific examples of personal financial management and bill payment systems include, but are not limited to TurboTax™ available from Intuit, Inc. of Mountain View, Calif.; TurboTax Online™ available from Intuit, Inc. of Mountain View, Calif.; or various other software systems discussed herein, or known to those of skill in the art at the time of filing, or as developed after the time of filing.

Herein, the terms "software system" and "software application" are used interchangeably and can be, but are not limited to, any data management system implemented on a computing system, accessed through one or more servers, accessed through a network, accessed through a cloud, or provided through any system or by any mechanism or process, as discussed herein, or as known in the art at the time of filing, or as developed after the time of filing, that gathers/obtains data, from one or more sources or has the capability to analyze at least part of the data.

As used herein, the terms "computing system," "computing device," and "computing entity," include, but are not limited to, the following: a server computing system; a workstation; a desktop computing system; a mobile computing system, including, but not limited to, smart phones, portable devices, or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device or computing system that includes components that can execute all, or part, of any one of the processes or operations as described herein.

Herein, the term "production environment" includes the various components, or assets, used to deploy, implement, access, and use, a given software system as that software system is intended to be used. In various embodiments, production environments include multiple computing systems or assets that are combined, communicatively coupled, virtually or physically connected, or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets or components of the production environment; one or more communications channels for sending and receiving data used to implement at least part of the software system in the production environment; one or more access control systems for limiting access to various components of the production environment, such as firewalls and gateways;

one or more traffic or routing systems used to direct, control, or buffer data traffic to components of the production environment, such as routers and switches; one or more communications endpoint proxy systems used to buffer, process, or direct data traffic, such as load balancers or buffers; one or more secure communication protocols or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; or any other assets/components making up an actual production environment in which at least part of the software system is deployed, implemented, accessed, and run, e.g., operated, as discussed herein, or as known in the art at the time of filing, or as developed after the time of filing.

As used herein, the term "computing environment" includes, but is not limited to, a logical or physical grouping of connected or networked computing systems or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems or virtual assets making up the trusted computing environment, are either under the control of, or known to, a party.

In various embodiments, each computing environment includes allocated assets and virtual assets associated with, and controlled or used to create, or deploy, or operate at least part of the software system.

In various embodiments, one or more cloud computing environments are used to create, or deploy, or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, or as known in the art at the time of filing, or as developed after the time of filing.

In many cases, a given software system or service may utilize, and interface with, multiple cloud computing environments, such as multiple VPCs, in the course of being created, or deployed, or operated.

As used herein, the term "virtual asset" includes any virtualized entity or resource, or virtualized part of an actual, or "bare metal" entity. In various embodiments, the virtual assets can be, but are not limited to, the following: virtual machines, virtual servers, and instances implemented in a cloud computing environment; databases associated with a cloud computing environment, or implemented in a cloud computing environment; services associated with, or delivered through, a cloud computing environment; communications systems used with, part of, or provided through a cloud computing environment; or any other virtualized assets or sub-systems of "bare metal" physical devices such as mobile devices, remote sensors, laptops, desktops, point-of-sale devices, etc., located within a data center, within a cloud computing environment, or any other physical or logical location, as discussed herein, or as known/available in the art at the time of filing, or as developed/made available after the time of filing.

In various embodiments, any, or all, of the assets making up a given production environment discussed herein, or as known in the art at the time of filing, or as developed after the time of filing can be implemented as one or more virtual assets.

In one embodiment, two or more assets, such as computing systems or virtual assets, or two or more computing environments are connected by one or more communications channels including but not limited to, Secure Sockets Layer (SSL) communications channels and various other secure communications channels, or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, or virtual assets, as discussed herein, or available or known at the time of filing, or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, or computing systems, whether available or known at the time of filing or as later developed.

Herein, the terms "party," "user," "user consumer," and "customer" are used interchangeably to denote any party or entity that interfaces with, or to whom information is provided by, the method and system for integrating financial transaction data into a personal financial management and bill payment system to more accurately identify and categorize tax related financial transactions using payment method described herein, or a person or entity that interfaces with, or to whom information is provided by, the method and system for integrating financial transaction data into a personal financial management and bill payment system to more accurately identify and categorize tax related financial transactions using payment method described herein, or a legal guardian of person or entity that interfaces with, or to whom information is provided by, the method and system for integrating financial transaction data into a personal financial management and bill payment system to more accurately identify and categorize tax related financial transactions using payment method described herein, or an authorized agent of any party or person or entity that interfaces with, or to whom information is provided by, the method and system for integrating financial transaction data into a personal financial management and bill payment system to more accurately identify and categorize tax related financial transactions using payment method described herein. For instance, in various embodiments, a user can be, but is not limited to, a person, a commercial entity, an application, a service, or a computing system.

Herein, the term "financial transaction" includes, but is not limited to, any interaction between two or more parties involving the transfer, or re-categorization, of funds between the parties. Herein, the term "financial transaction data" includes, but is not limited to, electronic data representing at least one financial transaction and that is capable of being processed by a processor, or stored in a memory, or is otherwise machine readable.

Herein, the term "product or service provider" includes any party or entity that is associated with a user through a financial transaction represented by financial transaction data.

As used herein, the term "bill" includes, but is not limited to, an account statement or other potentially recurring cost and financial transaction. Currently, bill payments due are represented in personal financial management and bill payment system payment due data. Herein, the term "bill related financial transaction data" includes data representing all, or part of, a bill. Examples of bills include, but are not limited to: rent payments, utility payments, credit card payments, mortgage payments, vehicle loan payments, etc. Bills are typically associated with larger, well known, or nationally or regionally known, payee businesses.

In contrast to the term "bill," herein the term "invoice" includes, but is not limited to, documents/data associated with a specific product or service provided by a business and for which full payment is typically requested via a discrete invoice statement. Herein the term "invoice related financial transaction data" includes data representing all, or part of, an "invoice." A given discrete invoice is therefore typically a non-recurring expense or is associated with specific products or services rendered, even though multiple, and even recurring identical, invoices can be generated by the same payee business for the same payor customer if multiple products or services, or the same products or services, are provided. Invoices are typically associated with smaller, regional or local, payee businesses than those associated with bills.

Herein the terms "payment," or "payment due," or "payment due items" are used interchangeably and include any payment owed, or made, by a first party, i.e., payor party, to a second party, i.e., a payee party. Consequently, as used herein, the terms "payment" or "payment due" include both "bills" and "invoices."

As used herein, the term "financial transaction data" can include data associated with any financial transaction conducted by, or on behalf of, a user of a personal financial management and bill payment system. Consequently, as used herein the term "financial transaction data" includes, but is not limited to: bill related financial transaction data; invoice related financial transaction data; and any other personal financial management and bill payment system payment data representing payment due items to be paid through the personal financial management and bill payment system.

As used herein, the terms "payor user" and "user" include any user of a personal financial management and bill payment system associated with a bill or invoice included in financial transaction data and to whom the financial transaction data is directed by a payee business.

As used herein, the term "payee business" includes any party or entity associated with a bill or invoice included in financial transaction data and to whom the amount associated with the bill or invoice represented in financial transaction data is owed by a payor user.

Herein, the terms "tax related bill or invoice," "tax related bill," and "tax related invoice" includes any bill or invoice associated with a financial transaction, i.e., requesting or resulting in, a transfer or re-categorization of funds, that includes a transfer or re-categorization of funds that has potential tax ramifications to a user, i.e., has a potential for resulting in tax consequences for the user or potentially causing a change in the user's tax liability. Examples of tax related bills and invoices include, but are not limited to; bills and invoices for home repair or home improvement work; bills and invoices for child care; bills and invoices associated with charitable donations and projects; bills and invoices associated with healthcare; bills and invoices associated with business automobile travel; bills and invoices associated with business expenses; bills and invoices associated with business travel; bills and invoices associated with business related computing systems, office equipment, or office/business electronics; bills and invoices for professional services related to a business; or any other bills and invoices requesting or resulting in, a transfer or re-categorization of funds, that includes a transfer or re-categorization of funds that has potential tax ramifications to a user, i.e., has a potential for resulting in tax consequences for the user or potentially causing a change in the user's tax liability.

Herein, the term "tax related financial transaction" includes any financial transaction, i.e., any transaction requesting or resulting in, a transfer or re-categorization of funds, that includes a transfer or re-categorization of funds that has potential tax ramifications to a user, i.e., has a potential for resulting in tax consequences for the user or potentially causing a change in the user's tax liability. Examples of tax related financial transactions include, but are not limited to; bills and invoices for home repair or home improvement work; bills and invoices for child care; bills and invoices associated with charitable donations and projects; bills and invoices associated with healthcare; bills and invoices associated with business automobile travel; bills and invoices associated with business expenses; bills and invoices associated with business travel; bills and invoices associated with business related computing systems, office equipment, or office/business electronics; bills and invoices for professional services related to a business; or any other bills and invoices requesting or resulting in, a transfer or re-categorization of funds, that includes a transfer or re-categorization of funds that has potential tax ramifications to a user, i.e., has a potential for resulting in tax consequences for the user or potentially causing a change in the user's tax liability.

As used herein, the term "payment method" includes a method by which one or more users of the personal financial management and bill payment system pay one or more discrete bills or invoices. In one embodiment, the payment method includes one or more financial accounts. In one embodiment, a financial account may include, but is not limited to, a credit account; a checking account; a line of credit; a stored value account; a debit account; a charge account; an ATM account; a stored-value account; a fleet account; a gift account; and a cash account.

As used herein, the term "known tax related payment methods" includes one or more payment methods associated with historical tax related financial transactions.

DETAILED DISCLOSURE

Embodiments will now be discussed with reference to the accompanying FIG.s, which depict one or more exemplary embodiments. Embodiments may be implemented in many different forms and should not be construed as limited to the embodiments set forth herein, shown in the FIG.s, or described below. Rather, these exemplary embodiments are provided to allow a complete disclosure that conveys the principles of the invention, as set forth in the claims, to those of skill in the art.

In accordance with one embodiment of a method and system for integrating financial transaction data into a personal financial management and bill payment system to more accurately identify and categorize tax related financial transactions using payment method, access to financial transaction data generated by one or more payee businesses is obtained.

In one embodiment, the obtained financial transaction data represents one or more discrete bills or invoices submitted by the one or more payee businesses requesting payment by one or more payor users of the personal financial management and bill payment system.

In one embodiment, the financial transaction data includes payee business identity data associated with each discrete bill and invoice represented in the financial transaction data. In one embodiment, the payee business identity data represents the identity of the payee business associated with each discrete bill and invoice represented in the financial transaction data.

In one embodiment, the financial transaction data also includes payor user identity data associated with each discrete bill and invoice represented in the financial transaction data. In one embodiment, the payor user identity data represents the identity of the payor user associated with each discrete bill and invoice represented in the financial transaction data.

In one embodiment, the financial transaction data further includes amount data associated with each discrete bill and invoice represented in the financial transaction data. In one embodiment, the amount data represents the payment amount associated with each discrete bill and invoice represented in the financial transaction data.

In one embodiment, the financial transaction data includes additional financial transaction data. In one embodiment, the financial transaction data includes additional financial transaction data, such as, but not limited to, Level-3 financial transaction data. In one embodiment, the additional financial transaction data is associated with at least one discrete bill or invoice represented in the financial transaction data and provides additional transaction details, or information, associated with at least one discrete bill or invoice represented in the financial transaction data.

In accordance with one embodiment, the financial transaction data generated by the one or more payee businesses is obtained from a business billing or invoicing system provided to business users of the business billing or invoicing system.

As noted above, herein, the term "business billing or invoicing system" includes, but is not limited to, any system through which a business can generate, or submit, or process bills or invoices requesting payment for products or services provided by the business to customers of the business. Therefore, the term "business billing or invoicing system" includes, but is not limited to, the following: computing system, desktop system, mobile system, or wearable device implemented, or online, or web-based, storage based, persistence based, business accounting or invoicing systems, services, packages, programs, modules, or applications; computing system, desktop system, mobile system, or wearable device implemented, or online, or web-based, storage based, persistence based, business financial transaction aggregation or processing systems, services, packages, programs, modules, or applications; computing system, desktop system, mobile system, or wearable device implemented, or online, or web-based, storage based, persistence based, business financial management and budgeting systems, services, packages, programs, modules, or applications; computing system, desktop system, mobile system, or wearable device implemented, or online, or web-based, storage based, persistence based, business management systems, services, packages, programs, modules, or applications; and various other business electronic data management systems, services, packages, programs, modules, or applications, whether known at the time of filling, or as developed later.

Specific examples of "business billing or invoicing systems" include, but are not limited to, the following: QuickBooks™, available from Intuit, Inc. of Mountain View, Calif.; QuickBooks Online™, available from Intuit, Inc. of Mountain View, Calif.; QuickBooks Self-Employed™, available from Intuit, Inc. of Mountain View, Calif.; or various other software systems discussed herein, or known to those of skill in the art at the time of filing, or as developed after the time of filing.

In some embodiments, the business billing or invoicing system is part of, or a feature of, a parent small business financial management system.

In one embodiment, a personal financial management and bill payment system is provided using one or more computing systems.

As noted above, herein, the term "personal financial management and bill payment system" includes, but is not limited to, the following: computing system, desktop system, mobile system, or wearable device implemented, or online, or web-based, storage based, persistence based, personal financial transaction aggregation or processing systems, services, packages, programs, modules, or applications; computing system, desktop system, mobile system, or wearable device implemented, or online, or web-based, storage based, persistence based, personal financial management and budgeting systems, services, packages, programs, modules, or applications; computing system, desktop system, mobile system, or wearable device implemented, or online, or web-based, storage based, persistence based, personal data management systems, services, packages, programs, modules, or applications; computing system, desktop system, mobile system, or wearable device implemented, or online, or web-based, storage based, persistence based, personal accounting systems, services, packages, programs, modules, or applications; and various other personal electronic data management systems, services, packages, programs, modules, or applications, whether known at the time of filling, or as developed later.

As noted above, specific examples of personal financial management and bill payment systems include, but are not limited to the following: Mint™, available from Intuit, Inc. of Mountain View, Calif.; Mint Online™, available from Intuit, Inc. of Mountain View, Calif.; or various other software systems discussed herein, or known to those of skill in the art at the time of filing, or as developed after the time of filing.

Currently, personal financial management and bill payment systems and business billing or invoicing systems are typically distinct software systems operated or used by two distinct parties, e.g., a customer of a business and an owner of a business, respectively. Therefore, currently, personal financial management and bill payment systems and business billing or invoicing systems typically operate in isolation from each other, even when they are offered by the same personal financial management and bill payment system and business billing or invoicing system provider.

As a specific illustrative example, in one embodiment, the personal financial management and bill payment system used by a customer of a business, or other user, could be a personal financial transaction management system such as Mint™, available from Intuit, Inc. of Mountain View, Calif. In this specific illustrative example, a business billing or invoicing system, used by a business user, could be a business billing or invoicing system such as QuickBooks™, available from Intuit, Inc. of Mountain View, Calif. As seen in this specific illustrative example, both the personal financial management and bill payment system and the business billing or invoicing system are offered by the same software system provider, i.e., in this specific case, Intuit, Inc. of Mountain View, Calif.

Consequently, according to one embodiment, in this specific illustrative example, the personal financial management and bill payment system and the business billing or invoicing system are provided the opportunity to share, "cross-pollinate," and cross-confirm supported data. This approach has several unique advantages.

In accordance with one embodiment, one or more processors associated with one or more computing systems are utilized to obtain access to the business billing or invoicing system and obtain financial transaction data generated by the one or more payee businesses.

In one embodiment, obtaining financial transaction data generated by the one or more payee businesses includes obtaining bill related financial transaction data. In one embodiment, obtaining financial transaction data generated by the one or more payee businesses includes obtaining invoice related financial transaction data.

In accordance with one embodiment, obtaining access to invoice related financial transaction data generated by the one or more payee businesses includes, but is not limited to:
 a. obtaining access to personal financial management and bill payment system user financial transaction data associated with the personal financial management and bill payment system, the personal financial management and bill payment system user financial transaction data representing financial transactions associated with users of the personal financial management and bill payment system;
 b. analyzing the personal financial management and bill payment system user financial transaction data associated with a first payor user to identify payee data included in the financial transaction data associated with the first payor user, the payee data representing one or more payees associated with first payor user financial transactions associated with the first payor user represented by a portion of the personal financial management and bill payment system user financial transaction data associated with the first payor user;
 c. obtaining access to business billing or invoicing system business user identification data associated with a business billing or invoicing system, the business user identification data representing business users of the business billing or invoicing system;
 d. accessing the payee data and the business user identification data and analyzing the payee data and business user identification data to determine if a payee represented in the payee data matches a business user of the business billing or invoicing system represented in the business user identification data;
 e. identifying a payee represented in the payee data that matches a business user of the business billing or invoicing system represented in the business user identification data, the payee being a payee associated with first financial transaction data representing a first financial transaction included in the personal financial management and bill payment system user financial transaction data associated with the first payor user;
 f. designating the payee represented in the payee data that matches the business user of the business billing or invoicing system as a first payee business;
 g. transforming status data associated with the first financial transaction data representing the first financial transaction to first invoice related financial transaction data;
 h. processing the first invoice related financial transaction data as invoice related financial transaction data; and
 i. providing the first payee business the capability to provide invoicing data representing invoices generated by the first payee business to the first payor user of the personal financial management and bill payment system through the personal financial management and bill payment system.

In accordance with one embodiment, obtaining access to invoice related financial transaction data generated by the one or more payee businesses includes, but is not limited to:
 a. obtaining access to personal financial management and bill payment system user identification data associated with users of a personal financial management and bill payment system;
 b. obtaining access to invoicing data generated through a business billing or invoicing system, the invoicing data representing invoices sent from payee business users of the business billing or invoicing system to payor customers of the payee business users of the business billing or invoicing system;
 c. monitoring the invoicing data and identifying first invoice data representing an invoice generated by a first payee business user of the business billing or invoicing system associated with a first payor customer of the first payee business user of the business billing or invoicing system;
 d. analyzing the first invoice data to identify first payor customer identification data associated with the first payor customer of the first payee business user of the business billing or invoicing system;
 e. analyzing the personal financial management and bill payment system user identification data and the first payor customer identification data to determine if the first payor customer associated with the first payor customer identification data is a first payor user of the personal financial management and bill payment system;
 f. if a determination is made that the first payor customer associated with the first payor customer identification data is a first payor user of the personal financial management and bill payment system, designating the first payor customer as a first payor user of the personal financial management and bill payment system; and
 g. providing the first payee business user of the business billing or invoicing system the capability to provide invoicing data representing invoices generated by the first payee business user of the business billing or invoicing system to the first payor user of the personal financial management and bill payment system through the personal financial management and bill payment system.

In accordance with one embodiment, obtaining access to invoice related financial transaction data generated by the one or more payee businesses includes, but is not limited to:

a. obtaining access to personal financial management and bill payment system user identification data associated with users of a personal financial management and bill payment system;

b. obtaining access to business billing or invoicing system payor customer identification data generated through a business billing or invoicing system, the business billing or invoicing system payor customer identification data being associated with payor customers of user payee businesses of a business billing or invoicing system;

c. analyzing the personal financial management and bill payment system user identification data and the business billing or invoicing system payor customer identification data to identify payor users of the personal financial management and bill payment system that are payor customers of business users of the business billing or invoicing system;

d. identifying a payor user of the personal financial management and bill payment system that is a payor customer of a payee business user of the business billing or invoicing system;

e. designating the payor user of the personal financial management and bill payment system a first payor user of the personal financial management and bill payment system;

f. providing the first payor user of the personal financial management and bill payment system the opportunity to integrate invoices generated by the first payee business user of the business billing or invoicing system into the personal financial management and bill payment system; and g. if the first payor user of the personal financial management and bill payment system agrees to integrate invoices generated by the first payee business user of the business billing or invoicing system into the personal financial management and bill payment system, providing the first payee business user of the business billing or invoicing system the capability to provide invoice data representing invoices generated by the first payee business user of the business billing or invoicing system to the first payor user of the personal financial management and bill payment system through the personal financial management and bill payment system.

In accordance with one embodiment, obtaining access to financial transaction data generated by the one or more payee businesses includes any method, system, process or procedure for obtaining access to financial transaction data generated by the one or more payee businesses as discussed herein, known in the art at the time of filing, or as developed/made available after the time of filing.

In accordance with one embodiment, obtaining access to financial transaction data generated by the one or more payee businesses includes any method, system, process or procedure for obtaining access to financial transaction data generated by the one or more payee businesses as discussed in: U.S. patent application Ser. No. 15/140,117, filed on behalf of the same Inventors of the present patent application, filed on Apr. 27, 2016, entitled "METHOD AND SYSTEM FOR PROVIDING INVOICES GENERATED THROUGH A BUSINESS INVOICING SYSTEM TO A CUSTOMER USER OF A PERSONAL FINANCIAL MANAGEMENT AND BILL PAYMENT SYSTEM," which is herein incorporated by reference in its entirety as if it were fully set forth herein; or U.S. patent application Ser. No. 15/140,131, filed on behalf of the same Inventors of the present patent application, filed on Apr. 27, 2016, entitled "METHOD AND SYSTEM FOR IDENTIFYING INVOICES THAT ARE PAID THROUGH A PERSONAL FINANCIAL MANAGEMENT AND BILL PAYMENT SYSTEM," which is herein incorporated by reference in its entirety as if it were fully set forth herein; or U.S. patent application Ser. No. 15/142,708, filed on behalf of the same Inventors of the present patent application, filed on Apr. 29, 2016, entitled "METHOD AND SYSTEM FOR INTEGRATING BUSINESS INVOICES INTO A PERSONAL FINANCIAL MANAGEMENT AND BILL PAYMENT SYSTEM," which is herein incorporated by reference in its entirety as if it were fully set forth herein.

In accordance with one embodiment, the financial transaction data is integrated into personal financial management and bill payment system payment due data associated with a personal financial management and bill payment system.

In one embodiment, the personal financial management and bill payment system payment due data represents one or more payments due associated with one or more users of the personal financial management and bill payment system as payment due items to be paid through the personal financial management and bill payment system.

In one embodiment, the personal financial management and bill payment system payment due data represents one or more payments associated with one or more users of the personal financial management and bill payment system that have been paid.

In accordance with one embodiment, the financial transaction data is integrated into personal financial management and bill payment system payment due data associated with a personal financial management and bill payment system by assigning an initial personal financial management and bill payment system financial transaction category, such as an "uncategorized" financial transaction category, to the discrete bills and invoices represented in the financial transaction data.

In accordance with one embodiment, the financial transaction data is integrated into personal financial management and bill payment system payment due data associated with a personal financial management and bill payment system by providing the bills and invoices represented in the financial transaction data as line items in a payment due or other financial transaction listing generated through the personal financial management and bill payment system.

In accordance with one embodiment, the financial transaction data is integrated into personal financial management and bill payment system payment due data associated with a personal financial management and bill payment system by any method, system, process or procedure for integrating financial transaction data into personal financial management and bill payment system payment due data as discussed herein, known in the art at the time of filing, or as developed/made available after the time of filing.

In accordance with various embodiments, the financial transaction data is integrated into personal financial management and bill payment system payment due data associated with a personal financial management and bill payment system by any method, system, process or procedure for integrating financial transaction data into personal financial management and bill payment system payment due data as discussed in: U.S. patent application Ser. No. 15/140,117, filed on behalf of the same Inventors of the present patent application, filed on Apr. 27, 2016, entitled "METHOD AND SYSTEM FOR PROVIDING INVOICES GENERATED THROUGH A BUSINESS INVOICING SYSTEM TO A CUSTOMER USER OF A PERSONAL FINANCIAL MANAGEMENT AND BILL PAYMENT SYSTEM," which is herein incorporated by reference in its entirety as if it were fully set forth herein; or U.S. patent application Ser. No. 15/140,131, filed on behalf of the same Inventors of the present patent application, filed on Apr. 27, 2016, entitled "METHOD AND SYSTEM FOR IDENTIFYING INVOICES THAT ARE PAID THROUGH A PERSONAL FINANCIAL MANAGEMENT AND BILL PAYMENT SYSTEM," which is herein incorporated by reference in its entirety as if it were fully set forth herein; or U.S. patent application Ser. No. 15/142,708, filed on behalf of the same Inventors of the present patent application, filed on Apr. 29, 2016, entitled "METHOD AND SYSTEM FOR INTEGRATING BUSINESS INVOICES INTO A PERSONAL FINANCIAL MANAGEMENT AND BILL PAYMENT SYSTEM," which is herein incorporated by reference in its entirety as if it were fully set forth herein.

In one embodiment, the personal financial management and bill payment system payment due data, including the integrated financial transaction data, includes payment method data. In one embodiment, payment method data includes data representing a method by which one or more users of the personal financial management and bill payment system pay one or more discrete bills or invoices. In one embodiment, payment method data includes data representing one or more accounts from which the one or more users of the personal financial management and bill payment system pay one or more discrete bills or invoices. In one embodiment, payment method data represents one or more financial accounts. In one embodiment, a financial account may include, but is not limited to, a credit account; a checking account; a line of credit; a stored value account; a debit account; a charge account; an ATM account; a stored-value account; a fleet account; a gift account; and a cash account.

For example, in one embodiment, a first payment method data represents an American Express™ credit account used by a user of the personal financial management and bill payment system to pay for a first discrete bill or invoice from an office supply store. In one embodiment, a second payment method data represents a checking account used by the user of the personal financial management and bill payment system to pay for a second discrete bill or invoice from a grocery store. In one embodiment, a third payment method data represents a Visa™ debit account used by the user of the personal financial management and bill payment system to pay for a third discrete bill or invoice from a gas station.

In accordance with one embodiment, access to the personal financial management and bill payment system and the personal financial management and bill payment system payment due data, including the integrated financial transaction data, and the payment method data is obtained.

In accordance with one embodiment, one or more processors associated with one or more computing systems are utilized to obtain access to the personal financial management and bill payment system and the personal financial management and bill payment system payment due data, including the integrated financial transaction data, and the payment method data.

In accordance with one embodiment, additional first financial transaction data is identified or extracted.

In accordance with one embodiment, the additional first financial transaction data includes Level-3 data associated with at least one discrete bill or invoice represented in the financial transaction data and provides additional transaction details, or information, associated with the at least one discrete bill or invoice represented in the financial transaction data.

As noted above, Level-3 financial transaction data includes data indicating not only the payee, payor, amount, and date of the financial transaction, but also line item listing data representing the item actually purchased, and the amount paid for each item listed. Specific examples/fields of Level-3 data include, but are not limited to: Quantity data; Item ID or SKU; Item description; Unit price; Extended price; Unit of measure (each); Commodity code; Line discount; Ship-From Zip Code; Destination Zip Code; Invoice Number; Item Extended Amount; Freight Amount; Duty Amount, etc.

In accordance with one embodiment, the personal financial management and bill payment system and the personal financial management and bill payment system payment due data, including the integrated financial transaction data, and the payment method data is analyzed to identify a first discrete bill or invoice represented in the financial transaction data that includes first payment method data associated with the first discrete bill or invoice represented in the financial transaction data.

In accordance with one embodiment, the personal financial management and bill payment system and the personal financial management and bill payment system payment due data, including the integrated financial transaction data, and the payment method data, is analyzed using one or more processors associated with one or more computing systems.

In one embodiment, the payment method data is compared to known tax related payment methods data. In one embodiment, the known tax related payment methods data represents one or more historical payment methods identified as associated with historical tax related financial transactions. In one embodiment, the payment method data is compared to the known tax related payment methods data to identify payment method data associated with financial transaction data representing one or more financial transactions having potential tax ramifications.

In one embodiment, the known tax related payment methods data is generated by obtaining access to historical financial transaction data. In one embodiment, the historical financial transaction data represents one or more historical financial transactions conducted by one or more users of the personal financial management and bill payment system. In one embodiment, historical tax related financial transaction data associated with the historical financial transaction data is identified. In one embodiment, the identified historical tax related financial transaction data associated with the historical financial transaction data is analyzed to identify historical payment method data associated with the identified historical tax related financial transaction data. In one embodiment, the identified historical payment method data is transformed into known tax related payment methods data.

Returning to the example used above, in one embodiment, the first payment method data represents an American Express™ credit account used by a user of the personal financial management and bill payment system to pay for a first discrete bill or invoice from an office supply store. In one embodiment, the first payment method data representing the American Express™ credit account is compared to the known tax related payment methods data.

In one embodiment, the user historically used the American Express™ credit account for business purchases having potential tax ramifications to the user. In one embodiment, because of this historical usage, the known tax related payment methods data includes data representing the American Express™ credit account as a known tax related payment method. Thus, in one embodiment, the American Express™ credit account is known to be associated with financial transactions having potential tax ramifications for the user.

In one embodiment, the first payment method data associated with the American Express™ payment method is compared to the known tax related payment methods data. In one embodiment, the first payment method data associated with the American Express™ payment method is identified as associated with the known tax related payment methods data. Therefore, in one embodiment, the first discrete bill or invoice associated with the first payment method data is identified as a first discrete bill or invoice having potential tax ramifications.

As noted above, herein, the term "tax related bill or invoice" includes any bill or invoice associated with a financial transaction, i.e., requesting or resulting in, a transfer or re-categorization of funds, that includes a transfer or re-categorization of funds that has potential tax ramifications to a user, i.e., has a potential for resulting in tax consequences for the user or potentially causing a change in the user's tax liability.

Examples of tax related bills and invoices include, but are not limited to; bills and invoices for home repair or home improvement work; bills and invoices for child care; bills and invoices associated with charitable donations and projects; bills and invoices associated with healthcare; bills and invoices associated with business automobile travel; bills and invoices associated with business expenses; bills and invoices associated with business travel; bills and invoices associated with business related computing systems, office equipment, or office/business electronics; bills and invoices for professional services related to a business; bills and invoices associated with office supplies; or any other bills and invoices requesting or resulting in, a transfer or re-categorization of funds, that includes a transfer or re-categorization of funds that has potential tax ramifications to a user, i.e., has a potential for resulting in tax consequences for the user or potentially causing a change in the user's tax liability.

In accordance with one embodiment, based, at least in part, on the analysis of the payment method data, a determination is made that the first discrete bill or invoice represented in the financial transaction data is a tax related bill or invoice having potential tax ramifications.

In accordance with one embodiment, once a determination is made that the first discrete bill or invoice represented in the financial transaction data is a tax related bill or invoice having potential tax ramifications, first bill or invoice status data associated with the first discrete bill or invoice represented in the financial transaction data is transformed into tax related status data.

In accordance with one embodiment, the portion of the financial transaction data representing the first discrete bill or invoice is then processed as tax related financial transaction data.

In accordance with one embodiment, the portion of the financial transaction data representing the first discrete bill or invoice is processed as tax related financial transaction data using the personal financial management and bill payment system.

In accordance with one embodiment, the portion of the financial transaction data representing the first discrete bill or invoice is processed as a tax related financial transaction by assigning a tax category to the portion of the financial transaction data representing the first discrete bill or invoice. In one embodiment, the assigned tax category is defined by one or more local, state, or federal tax agencies.

In accordance with one embodiment, the portion of the financial transaction data representing the first discrete bill or invoice is processed as tax related financial transaction data by providing a copy of the portion of the financial transaction data representing the first discrete bill or invoice to a tax preparation and filing system for processing as tax related financial transaction data.

As noted above, the terms "tax preparation system," "tax filing system," "tax return preparation and filing system," and "tax preparation and filing system," are used interchangeably and include, but are not limited to, the following: computing system, desktop system, mobile system, or wearable device implemented, or online, or web-based, storage based, persistence based, tax preparation and filing or processing systems, services, packages, programs, modules, or applications; and various other tax preparation and filing systems, services, packages, programs, modules, or applications, used to process or facilitate the filing of electronic tax or hardcopy tax return documents, whether known at the time of filing, or as developed later.

Specific examples of personal financial management and bill payment systems include, but are not limited to TurboTax™ available from Intuit, Inc. of Mountain View, Calif.; TurboTax Online™ available from Intuit, Inc. of Mountain View, Calif.; or various other software systems discussed herein, or known to those of skill in the art at the time of filing, or as developed after the time of filing.

Currently, personal financial management and bill payment systems, business billing or invoicing systems, and tax preparation systems are typically distinct software systems operated or used by at least two distinct parties, e.g., a customer of a business and an owner of a business, respectively. Currently, personal financial management and bill payment systems, business billing or invoicing systems, and tax preparation systems typically operate in isolation from each other, even when they are offered by the same personal financial management and bill payment systems, business billing or invoicing systems, and tax preparation systems provider.

As a specific illustrative example, in one embodiment, the personal financial management and bill payment system used by a customer of a business, or other user, could be a personal financial transaction management system such as Mint™, available from Intuit, Inc. of Mountain View, Calif. In this specific illustrative example, a business billing or invoicing system, used by a business user, could be a business billing or invoicing system such as QuickBooks™, available from Intuit, Inc. of Mountain View, Calif. In this specific illustrative example, a tax preparation system, used by a business user, a customer of a business, or other user, could be a tax preparation system such as TurboTax™, available from Intuit, Inc. of Mountain View, Calif. As seen in this specific illustrative example, the personal financial management and bill payment system, the business billing or invoicing system, and the tax preparation system are offered by the same software system provider, i.e., in this specific case, Intuit, Inc. of Mountain View, Calif.

Consequently, according to one embodiment, personal financial management and bill payment systems, business billing or invoicing systems, and tax preparation systems are provided the opportunity to share, "cross-pollinate," and cross-confirm supported data. This approach has several unique advantages and significantly enhances the user experience associated with all three systems.

FIG. 1 is a high level functionality-based block diagram of a hardware and production environment 100 for integrating financial transaction data into a personal financial management and bill payment system to more accurately identify and categorize tax related financial transactions using payment method, in accordance with one embodiment.

As seen in FIG. 1, in this specific illustrative example, production environment 100 includes: personal financial management and bill payment system computing system environment 110, including personal financial management and bill payment system 111; business billing or invoicing system computing system environment 120, including business billing or invoicing system 121; process computing system environment 130, including process computing system 131; and tax preparation system computing environment 160, including tax preparation system 161.

As seen in FIG. 1, in the specific illustrative example of FIG. 1, personal financial management and bill payment system 111 includes personal financial management and bill payment system payment due data 113 associated with one or more users (not shown) of personal financial management and bill payment system 111.

In one embodiment, personal financial management and bill payment system payment due data 113 represents one or more bills or invoices associated with one or more users (not shown) of personal financial management and bill payment system 111 to be paid through personal financial management and bill payment system 111. In one embodiment, personal financial management and bill payment system payment due data 113 includes data representing a payment due item listing (not shown).

In one embodiment, payment method data 112 includes data representing a method by which one or more payor users (not shown) of personal financial management and bill payment system 111 pay one or more discrete bills or invoices (not shown). In one embodiment, payment method data 112 includes data representing one or more accounts (not shown) from which one or more payor users (not shown) of personal financial management and bill payment system 111 pay one or more discrete bills or invoices (not shown). In one embodiment, payment method data 112 represents one or more financial accounts (not shown). In one embodiment, a financial account (not shown) may include, but is not limited to, a credit account; a checking account; a line of credit; a stored value account; a debit account; a charge account; an ATM account; a stored-value account; a fleet account; a gift account; and a cash account.

As seen in the specific illustrative example of FIG. 1, business billing or invoicing system 121 includes financial transaction data 123 generated by the one or more payee businesses (not shown).

In one embodiment, financial transaction data 123 represents one or more discrete bills or invoices (not shown) submitted by one or more payee businesses (not shown) requesting payment by one or more payor users (not shown) of personal financial management and bill payment system 111.

In one embodiment, financial transaction data 123 includes payee business identity data associated with each discrete bill or invoice represented in the financial transaction data (not shown). In one embodiment, the payee business identity data represents the identity of the payee business associated with each discrete bill and invoice represented in the financial transaction data 123.

In one embodiment, financial transaction data 123 also includes payor user identity data associated with each discrete bill and invoice represented in the financial transaction data (not shown). In one embodiment, the payor user identity data represents the identity of the payor user associated with each discrete bill and invoice represented in the financial transaction data.

In one embodiment, financial transaction data 123 further includes amount data associated with each discrete bill and invoice represented in the financial transaction data (not shown). In one embodiment, the amount data represents the payment amount associated with each discrete bill and invoice represented in the financial transaction data.

In one embodiment, financial transaction data 123 includes additional financial transaction data 114 providing additional transaction details, or information, associated with the at least one discrete bill or invoice represented in the financial transaction data 123.

As seen in the specific illustrative example of FIG. 1, process computing system 131 includes business billing or invoicing system access module 134, i.e., one example of an financial transaction data acquisition module, for obtaining access to financial transaction data 123 and additional financial transaction data 114.

As seen in the specific illustrative example of FIG. 1, process computing system 131 includes personal financial management and bill payment system access module 133 for obtaining access to personal financial management and bill payment system 111, personal financial management and bill payment system payment due data 113 and additional financial transaction data 114 as integrated into personal financial management and bill payment system payment due data 113 by integration module 135.

As seen in the specific illustrative example of FIG. 1, process computing system 131 includes integration module 135 for integrating financial transaction data 123, including additional financial transaction data 114, into personal financial management and bill payment system payment due data 113 associated with personal financial management and bill payment system 111.

As seen in the specific illustrative example of FIG. 1, process computing system 131 includes first financial transaction data acquisition module 137 for analyzing financial transaction data 123 of personal financial management and bill payment system payment due data 113 and identifying and extracting additional first payment method data 143 associated with a first discrete bill or invoice (not shown) represented in financial transaction data 123.

As seen in FIG. 1, in the specific illustrative example of FIG. 1, process computing system 131 includes analysis module 139 for analyzing payment method data 112 to determine if the first discrete bill or invoice (not shown) represented in financial transaction data 123 is a tax related bill or invoice having potential tax ramifications.

In one embodiment, analysis module 139 compares payment method data 112 against first known tax related payment method data 173, second known tax related payment method data 175, and third known tax related payment method data 177 stored within categorized payment method database 171 to determine if the first discrete bill or invoice (not shown) represented in financial transaction data 123 is a tax related bill or invoice having potential tax ramifications.

In one embodiment, payment method data 112 is compared to first known tax related payment method data 173, second known tax related payment method data 175, and third known tax related payment method data 177. In one embodiment, first known tax related payment method data 173, second known tax related payment method data 175, and third known tax related payment method data 177 represent one or more payment methods identified as associated with tax related financial transactions.

In one embodiment, analysis module 139 analyzes additional financial transaction data 114 to determine if the first discrete bill or invoice (not shown) represented in financial transaction data 123 is a tax related bill or invoice having potential tax ramifications.

As seen in the specific illustrative example of FIG. 1, process computing system 131 includes tax status transformation module 140 for transforming first bill or invoice tax status data 153 associated with the first discrete bill or invoice (not shown) represented in financial transaction data 123 to first bill or invoice tax status data 153 indicating a tax related bill or invoice status if analysis module 139 determines that the first discrete bill or invoice (not shown) represented in financial transaction data 123 is a tax related bill or invoice having potential tax ramifications.

As seen in FIG. 1, in the specific illustrative example of FIG. 1, process computing system 131 includes tax related bill or invoice data transfer module 155 for transferring the first discrete invoice (not shown) represented in financial transaction data 123 having a first invoice status data 153 indicating a tax related bill or invoice status to tax preparation system computing environment 160 and tax preparation system 161 for processing as tax related financial transaction data (not shown).

The disclosed embodiments provide an efficient, effective, and highly adaptable solution to the long standing technical need in the bill and invoice payment, bill and invoice processing, tax preparation and filing, and financial management arts for automatically integrating financial transaction data into a personal financial management and bill payment system, or obtaining, identifying, or distinguishing, financial transaction data, processing the integrated financial transaction data to extract payment method data, and then using the payment method data to more accurately and automatically identify tax related financial transactions for processing as tax related financial transactions having tax ramifications.

However, the disclosed method and system for integrating financial transaction data into a personal financial management and bill payment system to more accurately identify and categorize tax related financial transactions using payment method does not encompass, embody, or preclude other forms of innovation in the area of automated financial transaction bill payment, processing, and reporting, or tax preparation and filing. In addition, the disclosed method and system for integrating financial transaction data into a personal financial management and bill payment system to more accurately identify and categorize tax related financial transactions using payment method is not related to any fundamental economic practice, fundamental data processing practice, mental steps, or pen and paper based solution. In fact, the disclosed embodiments are directed to providing solutions to the relatively new problems associated with the automatic processing and display of electronic financial transaction data obtained from multiple sources, making electronic bill payments and determining tax liabilities, and the management and processing of large amounts of data, i.e., "big data." Consequently, the disclosed method and system for integrating financial transaction data into a personal financial management and bill payment system to more accurately identify and categorize tax related financial transactions using payment method is not directed to, does not encompass, and is not merely, an abstract idea or concept.

In addition, the disclosed method and system for integrating financial transaction data into a personal financial management and bill payment system to more accurately identify and categorize tax related financial transactions using payment method provides for significant improvements to the technical fields of electronic transaction data processing, tax return preparation, bill and invoice processing, financial transaction categorization, information dissemination, data processing, data management, data filtering and mining, automatic electronic bill payment, and user experience.

Furthermore, by allowing for the integration of bills and invoices and bill and invoice data into a personal financial management and bill payment system, the disclosed method and system for integrating financial transaction data into a personal financial management and bill payment system to more accurately identify and categorize tax related financial transactions using payment method helps users of the personal financial management and bill payment system identify and pay their bills, invoices, and taxes. This, in turn, helps avoid the reissuance and repeated transmission of payment and tax due reminders and for the entry, processing, and dissemination of redundant bill, invoice, and tax data; thereby eliminating unnecessary data analysis before resources are allocated to processing, or correcting, redundant data and the redundant data is further transmitted/distributed.

In addition, the disclosed method and system for integrating financial transaction data into a personal financial management and bill payment system to more accurately identify and categorize tax related financial transactions using payment method provides for the entry, processing, and dissemination of only relevant portions of tax related data; thereby eliminating unnecessary data analysis and correction before resources are allocated to processing, or correcting, faulty/irrelevant data, or the faulty/irrelevant data is further transmitted/distributed.

Consequently, using the disclosed method and system for integrating financial transaction data into a personal financial management and bill payment system to more accurately identify and categorize tax related financial transactions using payment method results in more efficient use of human and non-human resources, fewer processor cycles being utilized, reduced memory utilization, and less communications bandwidth being utilized to relay data to, and from, backend systems and client systems.

As a result, computing systems are transformed into faster, more efficient, and more effective computing systems by implementing the method and system for integrating financial transaction data into a personal financial management and bill payment system to more accurately identify and categorize tax related financial transactions using payment method.

Process

In accordance with one embodiment, financial transaction data is obtained and integrated into a personal financial management and bill payment system. In one embodiment, the integrated financial transaction data is then analyzed to identify and extract payment method data. The payment method data is then used to more accurately and automatically identify tax related financial transactions for processing as tax related financial transactions having tax ramifications, in one embodiment.

Consequently, using the disclosed embodiments, payment method data obtained from the personal financial management and bill payment system, is leveraged to identify tax related financial transactions for processing as tax related financial transactions having tax ramifications.

Therefore, disclosed herein is a technical solution to the long standing technical need in the financial management and user experience arts for automatically integrating financial transaction data into a personal financial management and bill payment system, or obtaining, identifying, or distinguishing, financial transaction data, processing the integrated financial transaction data to extract payment method data, and then using the additional financial transaction data to more accurately and automatically identify tax related financial transactions for processing as tax related financial transactions having tax ramifications.

Figure 2:
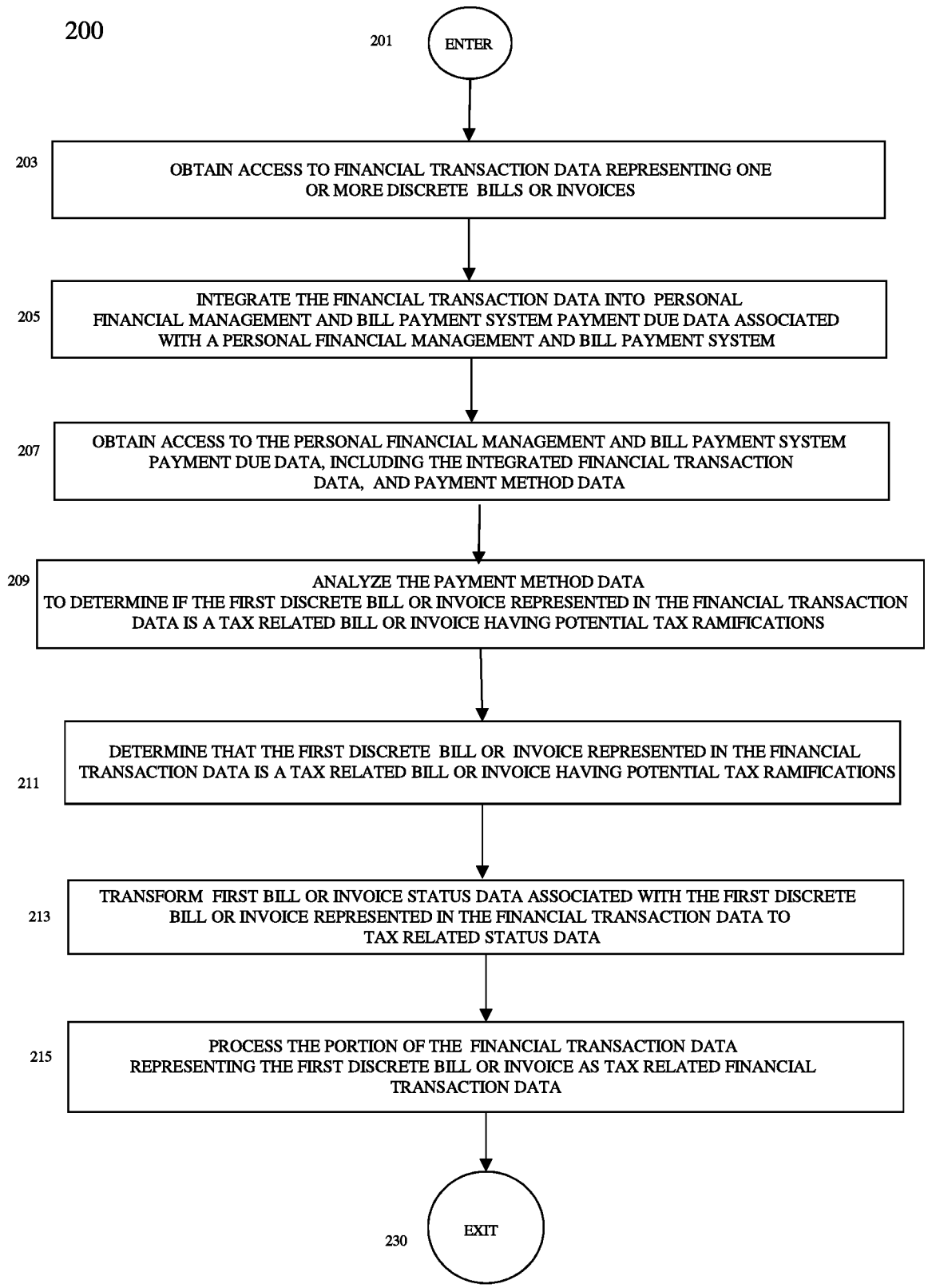
FIG. 2 is a flow chart representing one example of a generalized process for integrating financial transaction data into a personal financial management and bill payment system to more accurately identify and categorize tax related financial transactions using payment method, in accordance with one embodiment.

FIG. 2 is a flow chart representing one example of a process 200 for integrating financial transaction data into a personal financial management and bill payment system to more accurately identify and categorize tax related financial transactions using payment method in accordance with one embodiment.

As seen in FIG. 2, process 200 for integrating financial transaction data into a personal financial management and bill payment system to more accurately identify and categorize tax related financial transactions using payment method begins at ENTER OPERATION 201 and process flow proceeds to OBTAIN ACCESS TO FINANCIAL TRANSACTION DATA REPRESENTING ONE OR MORE DISCRETE BILLS OR INVOICES OPERATION 203.

In one embodiment, at OBTAIN ACCESS TO FINANCIAL TRANSACTION DATA REPRESENTING ONE OR MORE DISCRETE BILLS OR INVOICES OPERATION 203, access to financial transaction data generated by the one or more payee businesses is obtained.

In one embodiment, the obtained financial transaction data of OBTAIN ACCESS TO FINANCIAL TRANSACTION DATA REPRESENTING ONE OR MORE DISCRETE BILLS OR INVOICES OPERATION 203 represents one or more discrete bills or invoices submitted by one or more payee businesses requesting payment by one or more payor users of the personal financial management and bill payment system.

In one embodiment, the financial transaction data of OBTAIN ACCESS TO FINANCIAL TRANSACTION DATA REPRESENTING ONE OR MORE DISCRETE BILLS OR INVOICES OPERATION 203 includes payee business identity data associated with each discrete bill and invoice represented in the financial transaction data. In one embodiment, the payee business identity data represents the identity of the payee business associated with each discrete bill and invoice represented in the financial transaction data.

In one embodiment, the financial transaction data of OBTAIN ACCESS TO FINANCIAL TRANSACTION DATA REPRESENTING ONE OR MORE DISCRETE BILLS OR INVOICES OPERATION 203 also includes payor user identity data associated with each discrete bill and invoice represented in the financial transaction data. In one embodiment, the payor user identity data represents the identity of the payor user associated with each discrete bill and invoice represented in the financial transaction data.

In one embodiment, the financial transaction data of OBTAIN ACCESS TO FINANCIAL TRANSACTION DATA REPRESENTING ONE OR MORE DISCRETE BILLS OR INVOICES OPERATION 203 includes amount data associated with each discrete bill and invoice represented in the financial transaction data. In one embodiment, the amount data represents the payment amount associated with each discrete bill and invoice represented in the financial transaction data.

In one embodiment, the financial transaction data of OBTAIN ACCESS TO FINANCIAL TRANSACTION DATA REPRESENTING ONE OR MORE DISCRETE BILLS OR INVOICES OPERATION 203 includes additional financial transaction data, such as, but not limited to, Level-3 financial transaction data.

In one embodiment, the additional financial transaction data of OBTAIN ACCESS TO FINANCIAL TRANSACTION DATA REPRESENTING ONE OR MORE DISCRETE BILLS OR INVOICES OPERATION 203 is associated with at least one discrete bill or invoice represented in the financial transaction data and provides additional transaction details, or information, associated with at least one discrete bill and invoice represented in the financial transaction data.

In accordance with one embodiment, at OBTAIN ACCESS TO FINANCIAL TRANSACTION DATA REPRESENTING ONE OR MORE DISCRETE BILLS OR INVOICES OPERATION 203 the financial transaction data generated by the one or more payee businesses is obtained from a business billing or invoicing system provided to business users of the business billing or invoicing system.

In accordance with one embodiment, at OBTAIN ACCESS TO FINANCIAL TRANSACTION DATA REPRESENTING ONE OR MORE DISCRETE BILLS OR INVOICES OPERATION 203 one or more processors associated with one or more computing systems are utilized to obtain access to the business billing or invoicing system and obtain financial transaction data generated by the one or more payee businesses.

In accordance with one embodiment, obtaining access to financial transaction data generated by the one or more payee businesses at OBTAIN ACCESS TO FINANCIAL TRANSACTION DATA REPRESENTING ONE OR MORE DISCRETE BILLS OR INVOICES OPERATION 203 includes, but is not limited to:

a. obtaining access to personal financial management and bill payment system user financial transaction data associated with the personal financial management and bill payment system, the personal financial management and bill payment system user financial transaction data representing financial transactions associated with users of the personal financial management and bill payment system;

b. analyzing the personal financial management and bill payment system user financial transaction data associated with a first payor user to identify payee data included in the financial transaction data associated with the first payor user, the payee data representing one or more payees associated with first payor user financial transactions associated with the first payor user represented by a portion of the personal financial management and bill payment system user financial transaction data associated with the first payor user;

c. obtaining access to business billing or invoicing system business user identification data associated with a business billing or invoicing system, the business user identification data representing business users of the business billing or invoicing system;

d. accessing the payee data and the business user identification data and analyzing the payee data and business user identification data to determine if a payee represented in the payee data matches a business user of the business billing or invoicing system represented in the business user identification data;

e. identifying a payee represented in the payee data that matches a business user of the business billing or invoicing system represented in the business user identification data, the payee being a payee associated with first financial transaction data representing a first financial transaction included in the personal financial management and bill payment system user financial transaction data associated with the first payor user;

f. designating the payee represented in the payee data that matches the business user of the business billing or invoicing system as a first payee business;

g. transforming status data associated with the first financial transaction data representing the first financial transaction to first bill or invoice related financial transaction data;

h. processing the first bill or invoice related financial transaction data as financial transaction data; and i. providing the first payee business the capability to provide billing or invoicing data representing bills and invoices generated by the first payee business to the first payor user of the personal financial management and bill payment system through the personal financial management and bill payment system.

In accordance with one embodiment, obtaining access to financial transaction data generated by the one or more payee businesses at OBTAIN ACCESS TO FINANCIAL TRANSACTION DATA REPRESENTING ONE OR MORE DISCRETE BILLS OR INVOICES OPERATION 203 includes, but is not limited to:

a. obtaining access to personal financial management and bill payment system user identification data associated with users of a personal financial management and bill payment system;

b. obtaining access to billing and invoicing data generated through a business billing or invoicing system, the billing and invoicing data representing bills and invoices sent from payee business users of the business billing or invoicing system to payor customers of the payee business users of the business billing or invoicing system;

c. monitoring the billing and invoicing data and identifying first bill or invoice data representing a bill or invoice generated by a first payee business user of the business billing or invoicing system associated with a first payor customer of the first payee business user of the business billing or invoicing system;

d. analyzing the first bill or invoice data to identify first payor customer identification data associated with the first payor customer of the first payee business user of the business billing or invoicing system;

e. analyzing the personal financial management and bill payment system user identification data and the first payor customer identification data to determine if the first payor customer associated with the first payor customer identification data is a first payor user of the personal financial management and bill payment system;

f. if a determination is made that the first payor customer associated with the first payor customer identification data is a first payor user of the personal financial management and bill payment system, designating the first payor customer as a first payor user of the personal financial management and bill payment system; and g. providing the first payee business user of the business billing or invoicing system the capability to provide billing and invoicing data representing bills and invoices generated by the first payee business user of the business billing or invoicing system to the first payor user of the personal financial management and bill payment system through the personal financial management and bill payment system.

In accordance with one embodiment, obtaining access to financial transaction data generated by the one or more payee businesses at OBTAIN ACCESS TO FINANCIAL TRANSACTION DATA REPRESENTING ONE OR MORE DISCRETE BILLS OR INVOICES OPERATION 203 includes, but is not limited to:

a. obtaining access to personal financial management and bill payment system user identification data associated with users of a personal financial management and bill payment system;

b. obtaining access to business billing or invoicing system payor customer identification data generated through a business billing or invoicing system, the business billing or invoicing system payor customer identification data being associated with payor customers of user payee businesses of a business billing or invoicing system;

c. analyzing the personal financial management and bill payment system user identification data and the business billing or invoicing system payor customer identification data to identify payor users of the personal financial management and bill payment system that are payor customers of business users of the business billing or invoicing system;

d. identifying a payor user of the personal financial management and bill payment system that is a payor customer of a payee business user of the business billing or invoicing system;

e. designating the payor user of the personal financial management and bill payment system a first payor user of the personal financial management and bill payment system;

f. providing the first payor user of the personal financial management and bill payment system the opportunity to integrate bills and invoices generated by the first payee business user of the business billing or invoicing system into the personal financial management and bill payment system; and g. if the first payor user of the personal financial management and bill payment system agrees to integrate bills and invoices generated by the first payee business user of the business billing or invoicing system into the personal financial management and bill payment system, providing the first payee business user of the business billing or invoicing system the capability to provide bill and invoice data representing bills and invoices generated by the first payee business user of the business billing or invoicing system to the first payor user of the personal financial management and bill payment system through the personal financial management and bill payment system.

In accordance with one embodiment, obtaining access to financial transaction data generated by the one or more payee businesses at OBTAIN ACCESS TO FINANCIAL TRANSACTION DATA REPRESENTING ONE OR MORE DISCRETE BILLS OR INVOICES OPERATION 203 includes any method, system, process or procedure for obtaining access to financial transaction data generated by the one or more payee businesses as discussed herein, known in the art at the time of filing, or as developed/made available after the time of filing.

In accordance with one embodiment, obtaining access to financial transaction data generated by the one or more payee businesses at OBTAIN ACCESS TO FINANCIAL TRANSACTION DATA REPRESENTING ONE OR MORE DISCRETE BILLS OR INVOICES OPERATION 203 includes any method, system, process or procedure for obtaining access to financial transaction data generated by the one or more payee businesses as discussed in: U.S. patent application Ser. No. 15/140,117, filed on behalf of the same Inventors of the present patent application, filed on Apr. 27, 2016, entitled "METHOD AND SYSTEM FOR PROVIDING INVOICES GENERATED THROUGH A BUSINESS INVOICING SYSTEM TO A CUSTOMER USER OF A PERSONAL FINANCIAL MANAGEMENT AND BILL PAYMENT SYSTEM," which is herein incorporated by reference in its entirety as if it were fully set forth herein; or U.S. patent application Ser. No. 15/140,131, filed on behalf of the same Inventors of the present patent application, filed on Apr. 27, 2016, entitled "METHOD AND SYSTEM FOR IDENTIFYING INVOICES THAT ARE PAID THROUGH A PERSONAL FINANCIAL MANAGEMENT AND BILL PAYMENT SYSTEM," which is herein incorporated by reference in its entirety as if it were fully set forth herein; or U.S. patent application Ser. No. 15/142,708, filed on behalf of the same Inventors of the present patent application, filed on Apr. 29, 2016, entitled "METHOD AND SYSTEM FOR INTEGRATING BUSINESS INVOICES INTO A PERSONAL FINANCIAL MANAGEMENT AND BILL PAYMENT SYSTEM," which is herein incorporated by reference in its entirety as if it were fully set forth herein.

In one embodiment once access to financial transaction data generated by the one or more payee businesses is obtained at OBTAIN ACCESS TO FINANCIAL TRANSACTION DATA REPRESENTING ONE OR MORE DISCRETE BILLS OR INVOICES OPERATION 203, process flow proceeds to INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205.

In one embodiment, at INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205, the financial transaction data of OBTAIN ACCESS TO FINANCIAL TRANSACTION DATA REPRESENTING ONE OR MORE DISCRETE BILLS OR INVOICES OPERATION 203 is integrated into personal financial management and bill payment system payment due data associated with a personal financial management and bill payment system.

In one embodiment, a personal financial management and bill payment system is provided using one or more computing systems.

In accordance with one embodiment, at INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205, the financial transaction data is integrated into personal financial management and bill payment system payment due data associated with the personal financial management and bill payment system using one or more processors associated with one or more computing systems.

In one embodiment, the personal financial management and bill payment system payment due data represents one or more payments due associated with one or more users of the personal financial management and bill payment system as payment due items to be paid through the personal financial management and bill payment system.

In accordance with one embodiment, the financial transaction data is integrated into personal financial management and bill payment system payment due data associated with a personal financial management and bill payment system at INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 by providing the discrete bills and invoices represented in the financial transaction data as line items in a payment due or other financial transaction listing generated through the personal financial management and bill payment system.

In accordance with one embodiment, the financial transaction data is integrated into personal financial management and bill payment system payment due data associated with a personal financial management and bill payment system at INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 by assigning an initial personal financial management and bill payment system financial transaction category to the discrete bills and invoices represented in the financial transaction data, such as the "uncategorized" financial transaction category.

In accordance with one embodiment, the financial transaction data is integrated into personal financial management and bill payment system payment due data associated with a personal financial management and bill payment system at INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 by any method, system, process or procedure for integrating financial transaction data into personal financial management and bill payment system payment due data as discussed herein, known in the art at the time of filing, or as developed/made available after the time of filing.

In accordance with various embodiments, the financial transaction data is integrated into personal financial management and bill payment system payment due data associated with a personal financial management and bill payment system at INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 by any method, system, process or procedure for integrating financial transaction data into personal financial management and bill payment system payment due data as discussed in: U.S. patent application Ser. No. 15/140,117, filed on behalf of the same Inventors of the present patent application, filed on Apr. 27, 2016, entitled "METHOD AND SYSTEM FOR PROVIDING INVOICES GENERATED THROUGH A BUSINESS INVOICING SYSTEM TO A CUSTOMER USER OF A PERSONAL FINANCIAL MANAGEMENT AND BILL PAYMENT SYSTEM," which is herein incorporated by reference in its entirety as if it were fully set forth herein; or U.S. patent application Ser. No. 15/140,131, filed on behalf of the same Inventors of the present patent application, filed on Apr. 27, 2016, entitled "METHOD AND SYSTEM FOR IDENTIFYING INVOICES THAT ARE PAID THROUGH A PERSONAL FINANCIAL MANAGEMENT AND BILL PAYMENT SYSTEM," which is herein incorporated by reference in its entirety as if it were fully set forth herein; or U.S. patent application Ser. No. 15/142,708, filed on behalf of the same Inventors of the present patent application, filed on Apr. 29, 2016, entitled "METHOD AND SYSTEM FOR INTEGRATING BUSINESS INVOICES INTO A PERSONAL FINANCIAL MANAGEMENT AND BILL PAYMENT SYSTEM," which is herein incorporated by reference in its entirety as if it were fully set forth herein.

In one embodiment, once the financial transaction data is integrated into personal financial management and bill payment system payment due data associated with a personal financial management and bill payment system at INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205, process flow proceeds to OBTAIN ACCESS TO THE PERSONAL FINANCIAL MANAGEMENT AND BILL PAYMENT SYSTEM PAYMENT DUE DATA, INCLUDING THE INTEGRATED FINANCIAL TRANSACTION DATA, AND PAYMENT METHOD DATA OPERATION 207.

In one embodiment, at OBTAIN ACCESS TO THE PERSONAL FINANCIAL MANAGEMENT AND BILL PAYMENT SYSTEM PAYMENT DUE DATA, INCLUDING THE INTEGRATED FINANCIAL TRANSACTION DATA, AND PAYMENT METHOD DATA OPERATION 207, access to the personal financial management and bill payment system and the personal financial management and bill payment system payment due data, including the integrated financial transaction data, and the payment method data of ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209 is obtained.

In one embodiment, the payment method data includes data representing a method by which one or more users of the personal financial management and bill payment system pay one or more discrete bills or invoices. In one embodiment, the payment method data includes data representing one or more accounts from which the one or more users of the personal financial management and bill payment system pay one or more discrete bills or invoices. In one embodiment, payment method data represents one or more financial accounts. In one embodiment, a financial account may include, but is not limited to, a credit account; a checking account; a line of credit; a stored value account; a debit account; a charge account; an ATM account; a stored-value account; a fleet account; a gift account; and a cash account.

In one embodiment, at OBTAIN ACCESS TO THE PERSONAL FINANCIAL MANAGEMENT AND BILL PAYMENT SYSTEM PAYMENT DUE DATA, INCLUDING THE INTEGRATED FINANCIAL TRANSACTION DATA, AND PAYMENT METHOD DATA OPERATION 207, one or more processors associated with one or more computing systems are utilized to obtain access to the personal financial management and bill payment system and the personal financial management and bill payment system payment due data, including the integrated financial transaction data, and the payment method data.

In one embodiment, once access to the personal financial management and bill payment system and the personal financial management and bill payment system payment due data, including the integrated financial transaction data, and the payment method data is obtained at OBTAIN ACCESS TO THE PERSONAL FINANCIAL MANAGEMENT AND BILL PAYMENT SYSTEM PAYMENT DUE DATA, INCLUDING THE INTEGRATED FINANCIAL TRANSACTION DATA, AND PAYMENT METHOD DATA OPERATION 207, process flow proceeds to ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209.

In one embodiment, at ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209, the payment method data is identified, extracted, and analyzed to determine if the first discrete invoice represented in the financial transaction data is a tax related bill or invoice having potential tax ramifications.

In accordance with one embodiment, at ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209, the payment method data is compared to known tax related payment methods data. In one embodiment, the known tax related payment methods data represents one or more historical payment methods identified as associated with historical tax related financial transactions. In one embodiment, payment method data is compared to the known tax related payment methods data to identify payment method data associated with financial transaction data representing one or more financial transactions having potential tax ramifications.

In one embodiment, the known tax related payment methods data is generated by obtaining access to historical financial transaction data. In one embodiment, the historical financial transaction data represents one or more historical financial transactions conducted by one or more users of the personal financial management and bill payment system. In one embodiment, historical tax related financial transaction data associated with the historical financial transaction data is identified. In one embodiment, the identified historical tax related financial transaction data associated with the historical financial transaction data is analyzed to identify historical payment method data associated with the identified historical tax related financial transaction data. In one embodiment, the identified historical payment method data is transformed into known tax related payment methods data.

In accordance with one embodiment, the personal financial management and bill payment system and the personal financial management and bill payment system payment due data, including the integrated financial transaction data, and the payment method data is analyzed at ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209 using one or more processors associated with one or more computing systems.

In accordance with one embodiment, additional first financial transaction data is identified or extracted from the personal financial management and bill payment system payment due data, including the integrated financial transaction data, of OBTAIN ACCESS TO THE PERSONAL FINANCIAL MANAGEMENT AND BILL PAYMENT SYSTEM PAYMENT DUE DATA, INCLUDING THE INTEGRATED FINANCIAL TRANSACTION DATA, AND PAYMENT METHOD DATA OPERATION 207 at ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209.

In accordance with one embodiment, the additional first financial transaction data includes Level-3 data associated with at least one discrete bill or invoice represented in the financial transaction data and provides additional transaction details, or information, associated with the at least one discrete bill or invoice represented in the financial transaction data.

As noted above, Level-3 financial transaction data includes data indicating not only the payee, payor, amount, and date of the financial transaction, but also line item listing data representing the item actually purchased, and the amount paid for each item listed. Specific examples/fields of Level-3 data include, but are not limited to: Quantity data; Item ID or SKU; Item description; Unit price; Extended price; Unit of measure (each); Commodity code; Line discount; Ship-From Zip Code; Destination Zip Code; Invoice Number; Item Extended Amount; Freight Amount; Duty Amount, etc.

In accordance with one embodiment, at ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209 the additional first financial transaction data is identified, extracted, and analyzed to determine if the first discrete bill or invoice represented in the financial transaction data is a tax related bill or invoice having potential tax ramifications.

As noted above, herein, the term "tax related bill or invoice" includes any bill or invoice associated with a financial transaction, i.e., requesting or resulting in, a transfer or re-categorization of funds, that includes a transfer or re-categorization of funds that has potential tax ramifications to a user, i.e., has a potential for resulting in tax consequences for the user or potentially causing a change in the user's tax liability.

Examples of tax related bill or invoices include, but are not limited to; bills and invoices for home repair or home improvement work; bills and invoices for child care; bills and invoices associated with charitable donations and projects; bills and invoices associated with healthcare; bills and invoices associated with business automobile travel; bills and invoices associated with business expenses; bills and invoices associated with business travel; bills and invoices associated with business related computing systems, office equipment, or office/business electronics; bills and invoices for professional services related to a business; or any other bills and invoices requesting or resulting in, a transfer or re-categorization of funds, that includes a transfer or re-categorization of funds that has potential tax ramifications to a user, i.e., has a potential for resulting in tax consequences for the user or potentially causing a change in the user's tax liability.

In accordance with one embodiment, once the payment method is analyzed to determine if the first discrete bill or invoice represented in the financial transaction data is a tax related bill or invoice having potential tax ramifications at ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209, process flow proceeds to DETERMINE THAT THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 211.

In one embodiment, at DETERMINE THAT THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 211 based, at least in part, on the analysis of the payment method data at ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209, a determination is made that the first discrete bill or invoice represented in the financial transaction data is a tax related bill or invoice having potential tax ramifications.

In one embodiment, once a determination is made that the first discrete bill or invoice represented in the financial transaction data is a tax related bill or invoice having potential tax ramifications at DETERMINE THAT THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 211, process flow proceeds to TRANSFORM FIRST BILL OR INVOICE STATUS DATA ASSOCIATED WITH THE FIRST DISCRETE BILL OR INVOICE REPRESENTED IN THE FINANCIAL TRANSACTION DATA TO TAX RELATED STATUS DATA OPERATION 213.

In one embodiment, at TRANSFORM FIRST BILL OR INVOICE STATUS DATA ASSOCIATED WITH THE FIRST DISCRETE BILL OR INVOICE REPRESENTED IN THE FINANCIAL TRANSACTION DATA TO TAX RELATED STATUS DATA OPERATION 213, first bill or invoice status data associated with the first discrete bill or invoice represented in the financial transaction data is transformed into tax related status data.

In one embodiment, once first bill or invoice status data associated with the first discrete bill or invoice represented in the financial transaction data is transformed into tax related status data at TRANSFORM FIRST BILL OR INVOICE STATUS DATA ASSOCIATED WITH THE FIRST DISCRETE BILL OR INVOICE REPRESENTED IN THE FINANCIAL TRANSACTION DATA TO TAX RELATED STATUS DATA OPERATION 213, the user of the personal financial management and bill payment system is provided the opportunity to review or approve the tax related status data of the first discrete bill or invoice represented in the financial transaction data.

In one embodiment, once first bill or invoice status data associated with the first discrete bill or invoice represented in the financial transaction data is transformed into tax related status data at TRANSFORM FIRST BILL OR INVOICE STATUS DATA ASSOCIATED WITH THE FIRST DISCRETE BILL OR INVOICE REPRESENTED IN THE FINANCIAL TRANSACTION DATA TO TAX RELATED STATUS DATA OPERATION 213, process flow proceeds to PROCESS THE PORTION OF THE FINANCIAL TRANSACTION DATA REPRESENTING THE FIRST DISCRETE BILL OR INVOICE AS TAX RELATED FINANCIAL TRANSACTION DATA OPERATION 215.

In one embodiment, at PROCESS THE PORTION OF THE FINANCIAL TRANSACTION DATA REPRESENTING THE FIRST DISCRETE BILL OR INVOICE AS TAX RELATED FINANCIAL TRANSACTION DATA OPERATION 215, the portion of the financial transaction data of INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 representing the first discrete bill or invoice of ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209 is processed as tax related financial transaction data.

In accordance with one embodiment, at PROCESS THE PORTION OF THE FINANCIAL TRANSACTION DATA REPRESENTING THE FIRST DISCRETE BILL OR INVOICE AS TAX RELATED FINANCIAL TRANSACTION DATA OPERATION 215 the portion of the financial transaction data representing the first discrete bill or invoice is processed as tax related financial transaction data using the personal financial management and bill payment system of OBTAIN ACCESS TO THE PERSONAL FINANCIAL MANAGEMENT AND BILL PAYMENT SYSTEM PAYMENT DUE DATA, INCLUDING THE INTEGRATED FINANCIAL TRANSACTION DATA, AND PAYMENT METHOD DATA OPERATION 207.

In accordance with one embodiment, at PROCESS THE PORTION OF THE FINANCIAL TRANSACTION DATA REPRESENTING THE FIRST DISCRETE BILL OR INVOICE AS TAX RELATED FINANCIAL TRANSACTION DATA OPERATION 215 the portion of the financial transaction data representing the first discrete bill or invoice is processed as tax related financial transaction data by assigning a tax category to the portion of the financial transaction data representing the first discrete bill or invoice. In one embodiment, the assigned tax category is defined by one or more local, state, or federal tax agencies.

In accordance with one embodiment, at PROCESS THE PORTION OF THE FINANCIAL TRANSACTION DATA REPRESENTING THE FIRST DISCRETE BILL OR INVOICE AS TAX RELATED FINANCIAL TRANSACTION DATA OPERATION 215 the portion of the financial transaction data representing the first discrete bill or invoice is processed as tax related financial transaction data by providing a copy of the portion of the financial transaction data representing the first discrete bill or invoice to a tax preparation and filing system for processing as tax related financial transaction data.

As noted above, the terms "tax preparation system," "tax filing system," "tax return preparation and filing system," and "tax preparation and filing system," are used interchangeably and include, but are not limited to, the following: computing system, desktop system, mobile system, or wearable device implemented, or online, or web-based, storage based, persistence based, tax preparation and filing or processing systems, services, packages, programs, modules, or applications; and various other tax preparation and filing systems, services, packages, programs, modules, or applications, used to process or facilitate the filing of electronic tax or hardcopy tax return documents, whether known at the time of filling, or as developed later.

Specific examples of personal financial management and bill payment systems include, but are not limited to TurboTax™ available from Intuit, Inc. of Mountain View, Calif.; TurboTax Online™ available from Intuit, Inc. of Mountain View, Calif.; or various other software systems discussed herein, or known to those of skill in the art at the time of filing, or as developed after the time of filing.

Currently, personal financial management and bill payment systems, business billing or invoicing systems, and tax preparation systems are typically distinct software systems operated or used by at least two distinct parties, e.g., a customer of a business and an owner of a business, respectively. Currently, personal financial management and bill payment systems, business billing or invoicing systems, and tax preparation systems typically operate in isolation from each other, even when they are offered by the same personal financial management and bill payment systems, business billing or invoicing systems, and tax preparation systems provider.

As a specific illustrative example, in one embodiment, the personal financial management and bill payment system used by a customer of a business, or other user, could be a personal financial transaction management system such as Mint™, available from Intuit, Inc. of Mountain View, Calif. In this specific illustrative example, a business billing or invoicing system, used by a business user, could be a business billing or invoicing system such as QuickBooks™, available from Intuit, Inc. of Mountain View, Calif. In this specific illustrative example, a tax preparation system, used by a business user, a customer of a business, or other user, could be a tax preparation system such as TurboTax™, available from Intuit, Inc. of Mountain View, Calif. As seen in this specific illustrative example, the personal financial management and bill payment system, the business billing or invoicing system, and the tax preparation system are offered by the same software system provider, i.e., in this specific case, Intuit, Inc. of Mountain View, Calif.

Consequently, according to one embodiment, personal financial management and bill payment system of INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205, the business billing or invoicing system of OBTAIN ACCESS TO FINANCIAL TRANSACTION DATA REPRESENTING ONE OR MORE DISCRETE BILLS OR INVOICES OPERATION 203, and, in one embodiment, the tax preparation system of PROCESS THE PORTION OF THE FINANCIAL TRANSACTION DATA REPRESENTING THE FIRST DISCRETE BILL OR INVOICE AS TAX RELATED FINANCIAL TRANSACTION DATA OPERATION 215, are provided the opportunity to share, "cross-pollinate," and cross-confirm supported data. This approach has several unique advantages and significantly enhances the user experience associated with all three systems.

In one embodiment, once the portion of the financial transaction data of INTEGRATE THE FINANCIAL TRANSACTION DATA INTO PERSONAL FINANCIAL MANAGEMENT AND BILL PAYMENT SYSTEM PAYMENT DUE DATA ASSOCIATED WITH A PERSONAL FINANCIAL MANAGEMENT AND BILL PAYMENT SYSTEM OPERATION 205 representing the first discrete bill or invoice of ANALYZE THE PAYMENT METHOD DATA TO DETERMINE IF THE FIRST DISCRETE BILL OR INVOICE REPRESENTED IN THE FINANCIAL TRANSACTION DATA IS A TAX RELATED BILL OR INVOICE HAVING POTENTIAL TAX RAMIFICATIONS OPERATION 209 is processed as tax related financial transaction data at PROCESS THE PORTION OF THE FINANCIAL TRANSACTION DATA REPRESENTING THE FIRST DISCRETE BILL OR INVOICE AS TAX RELATED FINANCIAL TRANSACTION DATA OPERATION 215, process flow proceeds to EXIT OPERATION 230.

In one embodiment, at EXIT OPERATION 230, process 200 for integrating financial transaction data into a personal financial management and bill payment system to more accurately identify and categorize tax related financial transactions using payment method is exited to await new data.

The disclosed embodiments of process 200 for integrating financial transaction data into a personal financial management and bill payment system to more accurately identify and categorize tax related financial transactions using payment method provide an efficient, effective, and highly adaptable solution to the long standing technical need in the bill payment, bill and invoice processing, tax preparation and filing, and financial management arts for automatically integrating financial transaction data into a personal financial management and bill payment system, or obtaining, identifying, or distinguishing, financial transaction data, processing the integrated financial transaction data to extract payment method data, and then using the payment method data to more accurately and automatically identify tax related financial transactions for processing as tax related financial transactions having tax ramifications.

However, process 200 for integrating financial transaction data into a personal financial management and bill payment system to more accurately identify and categorize tax related financial transactions using payment method does not encompass, embody, or preclude other forms of innovation in the area of automated financial transaction bill payment, processing, and reporting, or tax return preparation and filing. In addition, process 200 for integrating financial transaction data into a personal financial management and bill payment system to more accurately identify and categorize tax related financial transactions using payment method is not related to any fundamental economic practice, fundamental data processing practice, mental steps, or pen and paper based solution. In fact, the disclosed embodiments are directed to providing solutions to the relatively new problems associated with the automatic processing and display of electronic financial transaction data obtained from multiple sources, making electronic bill payments and determining tax liabilities, and the management and processing of large amounts of data, i.e., "big data." Consequently, process 200 for integrating financial transaction data into a personal financial management and bill payment system to more accurately identify and categorize tax related financial transactions using payment method is not directed to, does not encompass, and is not merely, an abstract idea or concept.

In addition, process 200 for integrating financial transaction data into a personal financial management and bill payment system to more accurately identify and categorize tax related financial transactions using payment method provides for significant improvements to the technical fields of electronic transaction data processing, tax return preparation, bill and invoice processing, financial transaction categorization, information dissemination, data processing, data management, data filtering and mining, automatic electronic bill payment, and user experience.

In addition, by allowing for the integration of invoices and invoice data into a personal financial management and bill payment system, process 200 for integrating financial transaction data into a personal financial management and bill payment system to more accurately identify and categorize tax related financial transactions using payment method helps users of the personal financial management and bill payment system identify and pay their bills, invoices, and taxes. This, in turn, helps avoid the reissuance and repeated transmission of payment and tax due reminders and for the entry, processing, and dissemination of redundant bill, invoice, and tax data; thereby eliminating unnecessary data analysis before resources are allocated to processing, or correcting, redundant data and the redundant data is further transmitted/distributed.

In addition process 200 for integrating financial transaction data into a personal financial management and bill payment system to more accurately identify and categorize tax related financial transactions using payment method provides for the entry, processing, and dissemination of only relevant portions of tax related data; thereby eliminating unnecessary data analysis and correction before resources are allocated to processing, or correcting, faulty/irrelevant data, or the faulty/irrelevant data is further transmitted/distributed.

Consequently, using process 200 for integrating financial transaction data into a personal financial management and bill payment system to more accurately identify and categorize tax related financial transactions using payment method results in more efficient use of human and non-human resources, fewer processor cycles being utilized, reduced memory utilization, and less communications bandwidth being utilized to relay data to, and from, backend systems and client systems.

As a result, computing systems are transformed into faster, more efficient, and more effective computing systems by implementing process 200 for integrating financial transaction data into a personal financial management and bill payment system to more accurately identify and categorize tax related financial transactions using payment method.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the mechanism or process used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "integrating," "generating," "monitoring," "determining," "defining," "designating," "obtaining," "accessing," "analyzing," "obtaining," "identifying," "designating," "categorizing," "receiving," "transmitting," "implementing," "associating," "aggregating," "initiating," "collecting," "creating," "transferring," "storing," "searching," "comparing," "providing," "transforming," "incorporating." "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method comprising:
obtaining, via one or more processors, access to financial transactions representing one or more discrete bills or invoices submitted by the one or more payee businesses requesting payment by one or more payor users of a system, the financial transactions including:
identity of the payee business associated with each discrete bill and invoice;
identity of the payor user associated with each discrete bill and invoice; and
payment amount associated with each discrete bill and invoice;
integrating, via the one or more processors, the financial transactions into payment due data representing one or more bills and invoices associated with one or more users of the system to be paid through the system;
obtaining, via the one or more processors, access to payment method data associated with a plurality of discrete bills or invoices of a user of the system represented in the financial transactions;
obtaining, via the one or more processors, access to a categorized payment method database comprising historical payment methods associated with historical tax related financial transactions;
automatically comparing, via the one or more processors, the payment method data to the historical payment methods to identify one or more payment methods that are associated with the historical payment methods and that match the payment method data, wherein the payment method data represents one or more of a credit account, a checking account, a line of credit, a stored value account, a debit account, a charge account, an ATM account, a stored-value account, a fleet account, a gift account, or a cash account; and transforming, via the one or more processors, the financial transactions representing the bills or invoices associated with the one or more identified payment methods into tax related financial transactions, wherein the transformation efficiently and accurately identifies the tax related financial transactions.

2. The method of claim 1, further comprising:
categorizing each of the transformed financial transactions as a tax-deductible financial transaction or a non-tax-deductible financial transaction.

3. The method of claim 1, wherein the historical payment methods are obtained by:
obtaining access to historical financial transactions conducted by the user;
identifying historical tax related financial transaction data associated with the historical financial transactions; and
analyzing the identified historical tax related financial transaction data to identify historical payment methods associated with the identified historical tax related financial transaction data.

4. The method of claim 1, wherein the historical payment methods are obtained from the user.

5. The method of claim 1, wherein the financial transactions include Level-3 data associated with at least one financial transaction.

6. The method of claim 1, wherein transforming, via the one or more processors, the financial transactions includes providing a copy of the bills or invoices associated with the one or more identified payment methods to a tax preparation and filing system for processing as the tax related financial transactions.

7. The method of claim 1, wherein transforming, via the one or more processors, the financial transactions includes assigning a tax category to the bills or invoices associated with the one or more identified payment methods.

8. The method of claim 1, wherein the system is configured to categorize financial transactions and pay bills.

* * * * *